US008914174B2

(12) United States Patent
Suzuki et al.

(10) Patent No.: US 8,914,174 B2
(45) Date of Patent: Dec. 16, 2014

(54) VEHICLE CONTROL DEVICE AND VEHICLE DRIVE SYSTEM

(75) Inventors: Takehiko Suzuki, Toyota (JP); Kyosuke Komizo, Anjo (JP); Takahiro Sekii, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 862 days.

(21) Appl. No.: 13/015,661

(22) Filed: Jan. 28, 2011

(65) Prior Publication Data

US 2011/0238248 A1 Sep. 29, 2011

(30) Foreign Application Priority Data

Mar. 25, 2010 (JP) ................................. 2010-070436

(51) Int. Cl.
*B60W 20/00* (2006.01)
*B60W 30/18* (2012.01)
*F16H 61/02* (2006.01)
*F16H 61/06* (2006.01)
*B60K 6/52* (2007.10)
*F16H 61/04* (2006.01)

(52) U.S. Cl.
CPC ..... *B60W 30/18072* (2013.01); *F16H 61/0213* (2013.01); *F16H 61/061* (2013.01); *B60K 6/52* (2013.01); *B60W 2030/1809* (2013.01); *B60Y 2300/18083* (2013.01); *F16H 2061/044* (2013.01); *Y02T 10/6265* (2013.01)
USPC ................ 701/22; 701/53; 701/54; 74/473.1; 180/65.275

(58) Field of Classification Search
USPC ............ 701/22, 53, 54; 74/473.1; 180/65.275
See application file for complete search history.

(56) References Cited

U.S. PATENT DOCUMENTS 7,524,266 B2 * 4/2009 Nobumoto et al. ........... 477/110
8,517,890 B2 8/2013 Hayashi et al.
(Continued)

FOREIGN PATENT DOCUMENTS

JP 51-104171 A 9/1976
JP 62-101953 A 5/1987
(Continued)

OTHER PUBLICATIONS

Japanese Search Report issued for PCT/JP2011/051887 dated May 18, 2011.

*Primary Examiner* — Helal A Algahaim
*Assistant Examiner* — Michael Fouche
(74) *Attorney, Agent, or Firm* — Sughrue Mion, PLLC

(57) ABSTRACT

A control device for controlling a vehicle drive unit including an input member drivingly connected to an engine; an output member drivingly connected to a wheel; and a transmission device that includes engagement elements, that switches between shift speeds by control of engagement and disengagement of engagement elements, and that transmits a rotational driving force of the input member to the output member at a speed changed at a speed ratio of each of the shift speeds. The control device includes a control unit that controls the transmission device to achieve a one-way transmission speed in a running idle state in which a vehicle is running while the rotational driving force of the input member is not transmitted to the output member and a rotational speed of the engine is controlled to a predetermined idle speed. The transmission device has, as one of the shift speeds, the one-way transmission speed at which the rotational driving force from the input member to the output member is transmitted but the rotational driving force from the output member to the input member is not transmitted.

20 Claims, 9 Drawing Sheets

(56) References Cited

U.S. PATENT DOCUMENTS

| | | | |
|---|---|---|---|
| 2004/0106500 A1* | 6/2004 | Ayabe et al. | 477/117 |
| 2006/0195243 A1 | 8/2006 | Suzuki | |
| 2007/0078040 A1 | 4/2007 | Nobumoto et al. | |
| 2009/0062994 A1* | 3/2009 | Nedachi et al. | 701/51 |
| 2010/0250075 A1* | 9/2010 | Suzuki et al. | 701/55 |
| 2010/0263951 A1* | 10/2010 | Hayashi et al. | 180/65.275 |

FOREIGN PATENT DOCUMENTS

| | | |
|---|---|---|
| JP | 07-266932 A | 10/1995 |
| JP | 2004-108566 A | 4/2004 |
| JP | 2005-304205 A | 10/2005 |
| JP | 2006-234122 A | 9/2006 |
| JP | 2007-100762 A | 4/2007 |
| WO | WO2008133061 * | 11/2008 |

* cited by examiner

|   | C1 | C2 | C3 | B1 | B2 | F |
|---|----|----|----|----|----|---|
| 1 | ○  |    |    |    |    | △ |
| 2 | ○  |    |    | ○  |    |   |
| 3 | ○  |    | ○  |    |    |   |
| 4 | ○  | ○  |    |    |    |   |
| 5 |    | ○  | ○  |    |    |   |
| 6 |    | ○  |    | ○  |    |   |
| R |    |    | ○  |    | ○  |   |

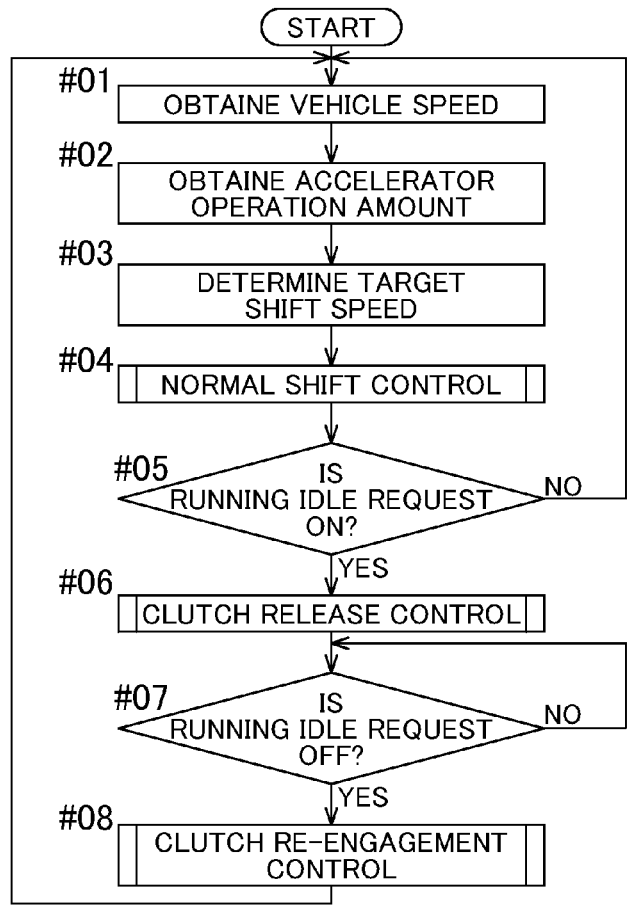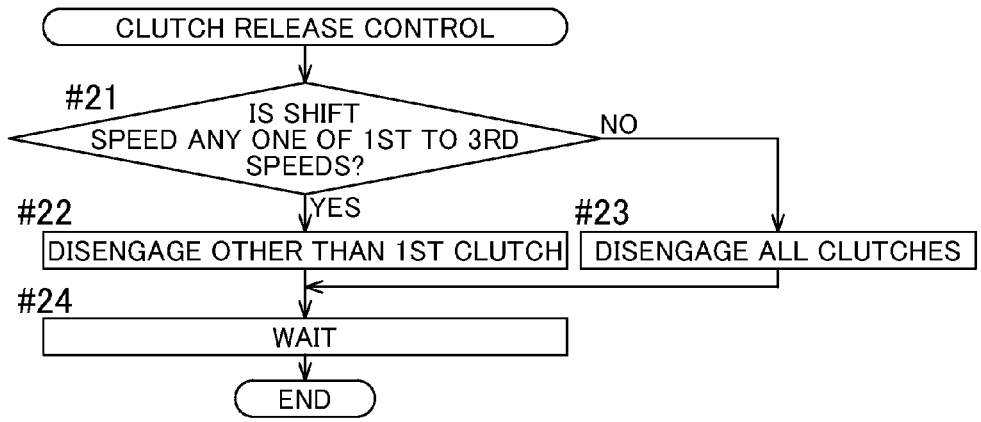

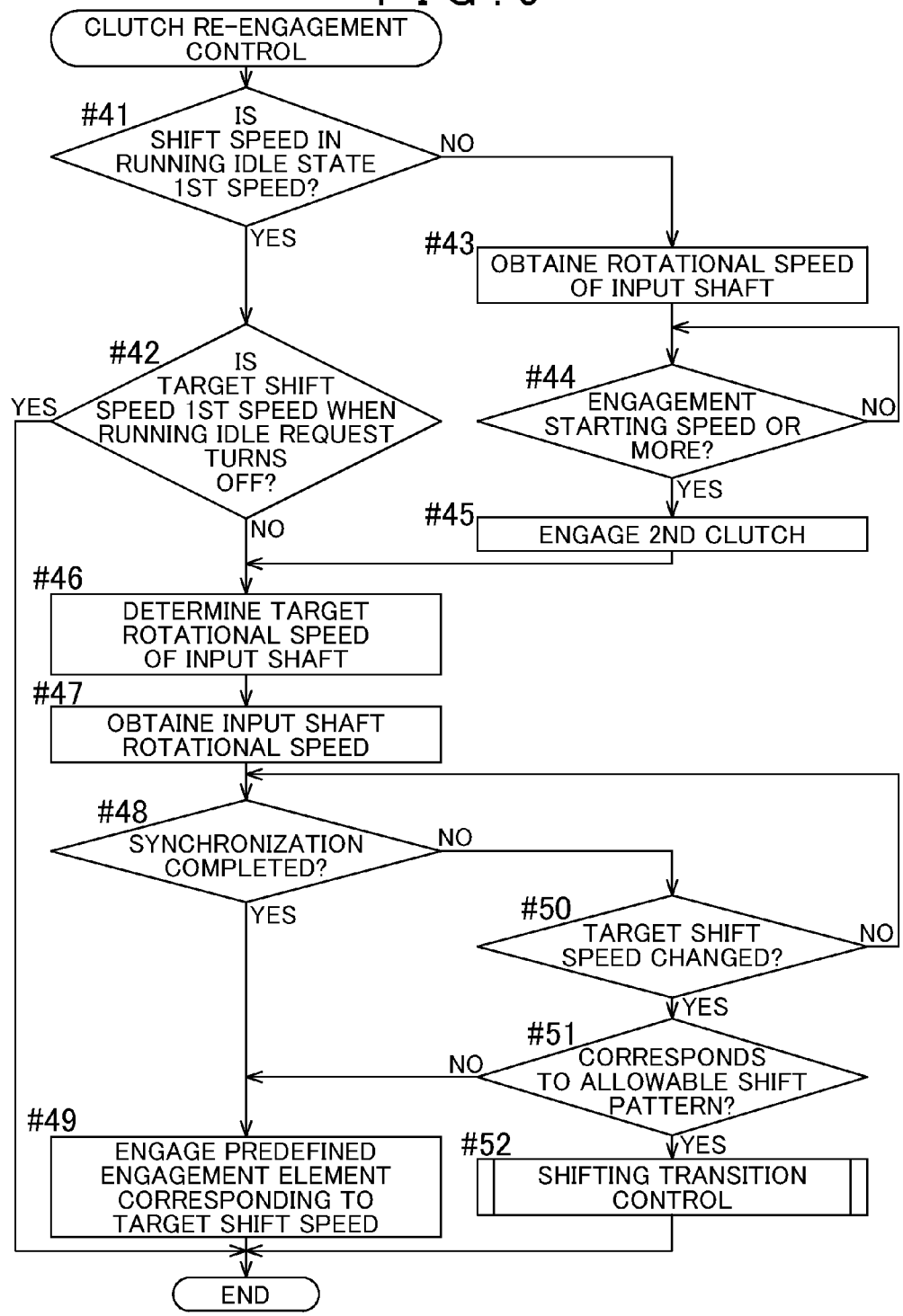

|   | C1 | C2 | C3 | B2 | F |
|---|----|----|----|----|---|
| 1 | ○  |    |    |    | △ |
| 2 | ○  |    | ○  |    |   |
| 3 | ○  | ○  |    |    |   |
| 4 |    | ○  | ○  |    |   |
| R |    |    | ○  | ○  |   |

VEHICLE CONTROL DEVICE AND VEHICLE DRIVE SYSTEM

INCORPORATION BY REFERENCE

The disclosure of Japanese Patent Application No. 2010-070436 filed on Mar. 25, 2010, including the specification, drawings and abstract is incorporated herein by reference in its entirety.

BACKGROUND OF THE INVENTION

The present invention relates to a control device for controlling a vehicle drive unit equipped with an input member drivingly connected to an engine, an output member drivingly connected to wheels, and a transmission device that transmits a rotational driving force of the input member to the output member at a speed changed at a speed ratio of each shift speed, and to a vehicle drive system equipped with the vehicle drive unit controlled by such a control device.

DESCRIPTION OF THE RELATED ART

As a conventional vehicle drive unit, for example, a device described in Japanese Patent Application Publication No. JP-A-7-266932 has already been known. In this drive unit, when a running vehicle is placed in a predetermined mild deceleration driving state in which a required driving force is much smaller than a vehicle running resistance, an advancing clutch provided between a transmission device and wheels is controlled to be in a released state so that an engine and the wheels are placed in a disconnected state of being not drivingly connected to each other, thereby letting the vehicle run freely. Consequently, the vehicle is placed in a state in which the so-called engine brake does not work, thus achieving the mild vehicle deceleration by the vehicle running resistance. In addition, in this free running state, the fuel consumption of the engine is suppressed by stopping the engine.

Then, when the vehicle is placed in a predetermined acceleration driving state in which the required driving force exceeds the vehicle running resistance while the vehicle is running freely, the engine is started, and the advancing clutch is controlled to be in an engaged state, thereby changing the state of the engine's rotational driving force so as to be transmitted to the wheels to accelerate the vehicle again.

SUMMARY OF THE INVENTION

However, with the technology described in Japanese Patent Application Publication No. JP-A-7-266932, the engine is kept stopped in the free running state. Therefore, the engine must be started when the state is changed to the acceleration driving state. Consequently, there has been a problem that the response in the driving force transmission becomes worse by a degree corresponding to the period of time required to start the engine as described above. In addition, with the technology described in Japanese Patent Application Publication No. JP-A-7-266932, when the state is changed to the acceleration driving state, the rotational driving force of the engine cannot be transmitted to the wheels to accelerate the vehicle until the advancing clutch is engaged to establish a connected state between the engine and the wheels. For this reason, there has been a problem that the response in the driving force transmission becomes worse by a degree corresponding to the period of time required to complete the engagement of the advancing clutch.

Moreover, with the technology described in Japanese Patent Application Publication No. JP-A-7-266932, the transmission device and the advancing clutch are structured to be hydraulically operated, and the hydraulic pressure is produced by driving an oil pump by rotation of the engine. However, because the engine is stopped in the free running state according to the technology described in Japanese Patent Application Publication No. JP-A-7-266932, the hydraulic pressure cannot be produced by rotation of the engine. Therefore, with the technology described in Japanese Patent Application Publication No. JP-A-7-266932, in order to operate the transmission device and the advancing clutch with a good response when the state is changed to the acceleration driving state, the vehicle drive unit is equipped with an electric motor for driving the oil pump so as to produce the hydraulic pressure even in the free running state by driving the electric motor. That is, with the technology described in Japanese Patent Application Publication No. JP-A-7-266932, because the electric motor for producing the hydraulic pressure must be provided in order to improve the response in the driving force transmission, there has been a problem that the structure of the vehicle drive unit is complicated.

Therefore, it is desired to realize a vehicle control device that can suppress the structure of a vehicle drive unit from being complicated and can improve the response in driving force transmission when a running vehicle is placed from the state in which the rotational driving force of an input member drivingly connected to an engine is not transmitted to an output member drivingly connected to the wheels to the state in which the rotational driving force of an input member is transmitted to the output member.

In order to achieve the object described above, a vehicle control device according to the present invention for controlling a vehicle drive unit that includes an input member drivingly connected to an engine, an output member drivingly connected to a wheel, and a transmission device that includes a plurality of engagement elements, that switches between a plurality of shift speeds by control of engagement and disengagement of the plurality of engagement elements, and that transmits a rotational driving force of the input member to the output member at a speed changed at a speed ratio of each of the shift speeds includes: a control unit that controls the transmission device so as to achieve a one-way transmission speed in a running idle state in which a vehicle is running while the rotational driving force of the input member is not transmitted to the output member and a rotational speed of the engine is controlled to a predetermined idle speed. In the vehicle control device, the transmission device has, as one of the plurality of shift speeds, the one-way transmission speed at which the rotational driving force from the input member to the output member is transmitted but the rotational driving force from the output member to the input member is not transmitted.

Note that, in the present application, the term "drivingly connected" refers to a state in which two rotational elements are connected so as to be capable of transmitting a driving force, and is used as a concept including a state in which the two rotational elements are connected so as to rotate as a unit, or a state in which the two rotational elements are connected so as to be capable of transmitting the driving force via one or two or more transmitting members. Such transmitting members include various members that transmit rotation at the same speed or at a changed speed, such as shafts, gear mechanisms, belts, and chains. However, when the term "drivingly connected" is applied to rotational elements of each planetary gear unit, the term refers to a state in which the plurality of rotational elements provided in the planetary gear unit are drivingly connected without interposing other rotational elements therebetween.

According to the present invention, the one-way transmission speed is achieved in the running idle state. Because the rotational driving force from the output member to the input member is not transmitted at the one-way transmission speed, the transmission of the driving force is cut off between the transmission device and the engine, thereby avoiding engine drag (engine brake, or co-rotation of the engine) in the running idle state. As a result, an energy loss associated with the engine drag is suppressed, thereby making possible, for example, to effectively utilize the rotational driving force from the output member for other use.

On the other hand, the rotational driving force from the input member to the output member is transmitted at the one-way transmission speed. Therefore, when transitioning from the running idle state to drive the vehicle with the rotational driving force of the engine, the rotational driving force of the engine can promptly be transmitted to the output member via the input member. In addition, because the engine is not stopped but controlled to an idle speed in the running idle state, the rotational driving force of the engine can promptly be transmitted to the output member after transitioning from the running idle state.

Therefore, according to the structure characterized as described above, the response in the driving force transmission can be improved when transitioning from the running idle state to drive the vehicle with the rotational driving force of the engine, while avoiding the engine drag in the running idle state.

In addition, because the engine is rotating in the running idle state, the rotation of the engine can generate power (such as hydraulic pressure) for achieving the one-way transmission speed. Consequently, it is unnecessary to provide any other power source (such as an electric pump) than the engine to achieve the one-way transmission speed in the running idle state, thereby suppressing the structure of the vehicle drive unit from being complicated.

Here, it is preferable that the vehicle control device of the present invention is structured such that the transmission device includes a first engagement element that transmits the rotational driving force of the input member to one of a plurality of rotational elements included in the transmission device in an engaged state and a unidirectional clutch that is placed in a state in which the rotational driving force from the input member to the output member is transmitted but the rotational driving force from the output member to the input member is not transmitted in the state in which the first engagement element is engaged, and such that the one-way transmission speed is achieved by cooperation between the engagement of the first engagement element and the unidirectional clutch.

According to this structure, with the combination of the first engagement element that is one of the engagement elements and the single unidirectional clutch, the one-way transmission speed can be achieved in an easy and appropriate manner with a simple structure.

It is also preferable that the vehicle control device of the present invention is structured such that the control unit achieves the one-way transmission speed by engaging the first engagement element in the running idle state if the shift speed in the transmission device before transitioning to the running idle state is a shift speed achieved by at least the engagement of the first engagement element, or the control unit disengages all of the engagement elements of the transmission device in the running idle state if the shift speed in the transmission device before transitioning to the running idle state is a shift speed other than that achieved by at least the engagement of the first engagement element.

According to this structure, the state of the shift speed in the transmission device in the running idle state can appropriately be established depending on the shift speed in the transmission device before transitioning to the running idle state.

That is, if the shift speed in the transmission device before transitioning to the running idle state is achieved by at least the engagement of the first engagement element, the one-way transmission speed can be achieved in an easy and prompt manner by only disengaging the engagement elements other than the first engagement element.

Otherwise, if the shift speed in the transmission device before transitioning to the running idle state is achieved by disengaging the first engagement element and engaging the other two engagement elements, all of the engagement elements are disengaged, thus increasing the degree of freedom of setting of the shift speed in the transmission device when transitioning from the running idle state, and thereby enabling an appropriate response depending on the situation.

It is also preferable that the vehicle control device of the present invention is structured such that the control unit achieves the one-way transmission speed by engaging the first engagement element in the running idle state if the running speed of the vehicle before transitioning to the running idle state is equal to or less than a predetermined disengagement threshold value, or the control unit disengages all of the engagement elements of the transmission device in the running idle state if the running speed of the vehicle before transitioning to the running idle state is more than the predetermined disengagement threshold value.

According to this structure, the state of the shift speed in the transmission device in the running idle state can appropriately be established depending on the running speed of the vehicle before transitioning to the running idle state.

That is, if the running speed of the vehicle before transitioning to the running idle state is a relatively low speed of the predetermined disengagement threshold value or less, a driving force to drive the vehicle is often required relatively promptly when transitioning from the running idle state. Therefore, under such a condition, the response in the driving force transmission can be improved when transitioning from the running idle state by achieving in advance the one-way transmission speed by engaging the first engagement element.

Otherwise, if the running speed of the vehicle before transitioning to the running idle state is a relatively high speed of more than the predetermined disengagement threshold value, the driving force to drive the vehicle is often hardly required when transitioning from the running idle state. Therefore, under such a condition, all of the engagement elements are disengaged, thus increasing the degree of freedom of setting of the shift speed in the transmission device when transitioning from the running idle state, and thereby enabling an appropriate response depending on the situation.

It is also preferable that the vehicle control device of the present invention is structured such that the one-way transmission speed is a shift speed having the largest speed reduction ratio between the input member and the output member among the forward shift speeds.

The situation of transitioning to the running idle state often occurs when the vehicle is decelerating. In such a situation, because the vehicle must be driven from the state of low (particularly, near-zero) vehicle speed when driven to transition from the running idle state, a large driving force is often required. According to the above-described structure, a shift speed having the largest speed reduction ratio among the forward shift speeds is set as the one-way transmission speed. Therefore, even in the case of driving the vehicle from the state of low (particularly, near-zero) vehicle speed, the rotational driving force of the input member can be transmitted at a reduced speed, thus transmitting a large driving force to the output member with a good response.

At the shift speed having the largest speed reduction ratio among the forward shift speeds, an excessively large engine brake force is generally often generated when an accelerator is turned off. Therefore, in order to reduce a shock caused by such an engine brake, there is a case of using a unidirectional clutch when achieving the shift speed having the largest speed reduction ratio. With the above-described structure, because the unidirectional clutch provided for that purpose can be commonly used as the unidirectional clutch for achieving the one-way transmission speed in the present invention, the one-way transmission speed can be achieved without adding any special parts.

It is also preferable that the vehicle control device of the present invention is structured such that, when the state of the vehicle during running returns from the running idle state to a normal state in which the rotational driving force of the input member is transmitted to the output member, the control unit performs engine rotational speed control for controlling the rotational speed of the input member so as to be a target rotational speed determined based on the running speed of the vehicle and a target shift speed in the transmission device, and then engages a predefined engagement element in the transmission device.

According to this structure, the engine rotational speed control engages the two rotational elements after synchronizing them (after making the rotational speeds approximately equal to each other). Therefore, a shift shock can be suppressed from occurring when the target shift speed is achieved.

It is also preferable that the vehicle control device of the present invention is structured such that, when the target shift speed in the transmission device has been changed before the rotational speed of the input member reaches the target rotational speed during the engine rotational speed control, the control unit performs the engine rotational speed control to achieve the target rotational speed before the change, and then achieves the target rotational speed after the change, if the changing pattern of the target shift speed does not correspond to a predetermined allowable shift pattern, or the control unit discontinues the engine rotational speed control and stops achieving the target rotational speed before the change, and achieves the target rotational speed after the change, if the changing pattern of the target shift speed corresponds to the allowable shift pattern.

According to this structure, if the changing pattern of the target shift speed corresponds to the predetermined allowable shift pattern, the shift speed is directly changed to the target shift speed after the change, thereby enabling to achieve the target shift speed early.

It is also preferable that the vehicle control device of the present invention is structured such that, if each of the shift speeds in the transmission device is achieved by engagement of two of the engagement elements, the allowable shift pattern is a changing pattern corresponding to a change between shift speeds in which the engagement elements engaged first are common and the engagement elements engaged later are different, and also to a change from a shift speed with a small speed reduction ratio to a shift speed with a large speed reduction ratio.

If the engagement element engaged first of the two engagement elements is common, switching between the target shift speeds before and after the change can be performed easily by only switching the engagement element engaged later between the respective engagement elements corresponding to the target shift speeds before and after the change.

When the target shift speed is changed from a shift speed with a small speed reduction ratio to a shift speed with a large speed reduction ratio (downshifted), a larger driving force is required. Therefore, it is desirable to achieve the target shift speed after the change at an early time.

Consequently, according to the above-described structure, the allowable shift pattern can appropriately be set, and the target shift speed can be achieved early if required.

It is also preferable that the vehicle control device of the present invention is structured such that the transmission device includes a first engagement element that transmits the rotational driving force of the input member to one of a plurality of rotational elements included in the transmission device in an engaged state, and a unidirectional clutch that is placed in a state in which the rotational driving force from the input member to the output member is transmitted but the rotational driving force from the output member to the input member is not transmitted in the state in which the first engagement element is engaged, and such that the one-way transmission speed is achieved by cooperation between the engagement of the first engagement element and the unidirectional clutch; the transmission device has the plurality of shift speeds in a switchable manner by selectively engaging any two of the plurality of engagement elements including the first engagement element, and has a shift speed achieved at least by engaging a second engagement element different from the first engagement element; and the control unit engages first the second engagement element of the two engagement elements when returning to the normal state, if the shift speed in the transmission device before transitioning of the engine to the running idle state is the shift speed achieved by engaging the second engagement element.

According to this structure, at the shift speed achieved at least by engaging the second engagement element, the engagement element engaged first can be either one of the first and the second engagement elements, by engaging the second engagement element first. Consequently, the number of allowable shift patterns can be increased, thereby enabling to achieve the target shift speed early under more situations.

It is also preferable that the vehicle control device of the present invention is structured such that all of the engagement elements of the transmission device are disengaged to establish, instead of the running idle state, a running idle-stop state in which the engine is stopped while the vehicle is running.

In the state in which all of the engagement elements of the transmission device are disengaged, there is no need to generate power (such as hydraulic pressure) for engaging the engagement elements of the transmission device. Therefore, the engine can be stopped while the vehicle is running even if no power source (such as an electric pump) is provided besides the engine. As a result, according to the above-described structure, fuel consumption by engine combustion is suppressed by stopping the engine in the state in which the engine can be stopped.

It is also preferable that the vehicle control device of the present invention is structured to include a mechanical pump driven by rotational driving force of the engine to discharge oil and an electric pump discharging oil, while the mechanical pump stops operating, so as to be capable of supplying hydraulic pressure to the plurality of engagement elements, and also structured such that the control unit places the electric pump in a non-driven state if all of the engagement elements of the transmission device are disengaged in the running idle-stop state.

If all of the engagement elements of the transmission device are disengaged, the hydraulic pressure need not be produced to engage the engagement elements of the transmission device. According to the above-described structure, even in the vehicle drive unit provided with the electric pump discharging oil while the mechanical pump stops operating, if all of the engagement elements of the transmission device are disengaged in the running idle-stop state, the electric pump is placed in the non-driven state to shorten the driving time of the electric pump, thereby enabling to extend the lifetime of the electric pump and to save battery power for driving the electric pump.

In the arrangements described above, it is preferable that the vehicle control device of the present invention is structured such that the transmission device specifically includes a first planetary gear unit having three rotational elements, including in the order of rotational speed, a first rotational element, a second rotational element, and a third rotational element, and a second planetary gear unit having four rotational elements, including in the order of rotational speed, a first rotational element, a second rotational element, a third rotational element, and a fourth rotational element; in the first planetary gear unit, the first rotational element being fixed to a non-rotating member, the second rotational element being selectively drivingly connected to the fourth rotational element of the second planetary gear unit via the first engagement element, and the third rotational element being drivingly connected to the input member; and in the second planetary gear unit, the second rotational element being selectively fixed to a non-rotating member via a unidirectional clutch that is placed in an engaged state to prevent rotation of the second rotational element when rotating in the negative direction relative to the non-rotating member, and the third rotational element being drivingly connected to the output member.

According to this structure, the transmission device can be provided with the one-way transmission speed achieved by cooperation between at least the engagement of the first engagement element and the unidirectional clutch. As a result, the vehicle drive unit provided with the transmission device as described above can appropriately be controlled to improve the response in the driving force transmission when transitioning from the running idle state while avoiding the engine drag in the running idle state.

Here, it is preferable that the transmission device of the present invention is structured such that the second rotational element of the first planetary gear unit is further selectively drivingly connected to the first rotational element of the second planetary gear unit, and the second rotational element of the second planetary gear unit is further selectively drivingly connected to the input member via the second engagement element.

According to this structure, the vehicle drive unit provided with the transmission device that includes at least four shift speeds in a switchable manner can appropriately be controlled to improve the response in the driving force transmission when transitioning from the running idle state while avoiding the engine drag in the running idle state.

It is also preferable that the transmission device of the present invention is structured such that the first rotational element of the second planetary gear unit is further selectively fixed to the non-rotating member.

According to this structure, the vehicle drive unit provided with the transmission device that is added with two more shift speeds to have six shift speeds in a switchable manner can appropriately be controlled to improve the response in the driving force transmission when transitioning from the running idle state while avoiding the engine drag in the running idle state.

A vehicle drive system according to the present invention has a structure characterized in that the output member included in the vehicle drive unit controlled by the vehicle control device that has been described above is drivingly connected to either one of a front wheel and a rear wheel of the vehicle, and an output shaft of a rotary electric machine capable of outputting a driving force is drivingly connected to the other one of the front wheel and the rear wheel of the vehicle.

Note that, in the present application, the term "rotary electric machine" is used as a concept including all of a motor (electric motor), a generator (electric generator), and a motor-generator that serves as a motor and a generator depending on the necessity.

As has been described above, with the vehicle control device according to the present invention, because the engine drag (engine brake, or co-rotation of the engine) in the running idle state is avoided, the energy loss associated with the engine drag can be suppressed. In that case, in the vehicle drive system in which the output shaft of the rotary electric machine is drivingly connected to either one of the front and rear wheels of the vehicle as characterized in the above-described structure, the rotary electric machine can perform regenerative braking while the energy loss is suppressed. Consequently, the efficiency of regeneration by the rotary electric machine can be improved.

Therefore, according to the structure characterized as described above, the vehicle drive system can have a good regeneration efficiency of the rotary electric machine in the running idle state and also a good response in the driving force transmission when transitioning from the running idle state.

BRIEF DESCRIPTION OF THE DRAWINGS

FIG. 7 is a flowchart showing an overall processing procedure of a switching control process according to the first embodiment;

FIG. 8 is a flowchart showing a processing procedure of clutch release control according to the first embodiment;

FIG. 9 is a flowchart showing a processing procedure of clutch re-engagement control according to the first embodiment;

DETAILED DESCRIPTION OF THE EMBODIMENTS

First Embodiment

Figure 1:
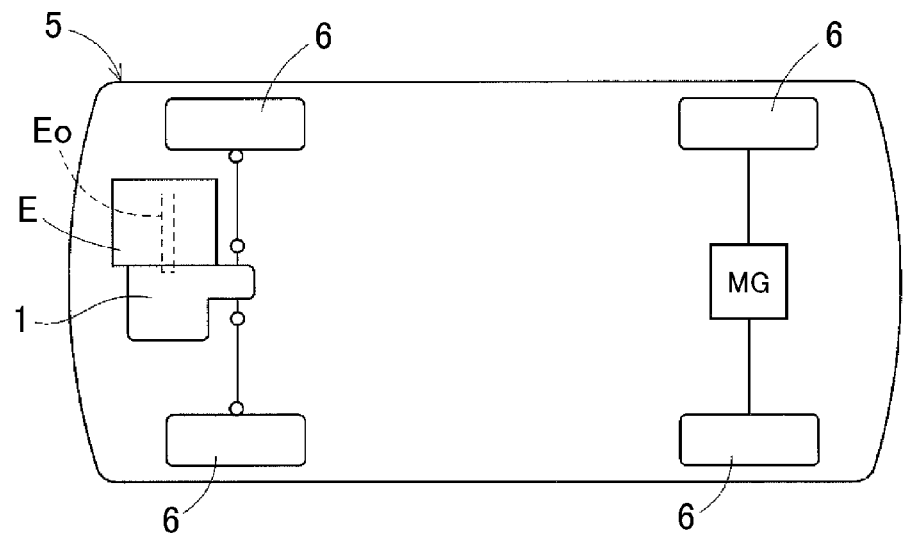
FIG. 1 is a diagram showing an overall structure of a vehicle equipped with a vehicle drive unit according to a first embodiment of the present invention.

A first embodiment of a vehicle control device according to the present invention will be described with reference to the accompanying drawings. In the present embodiment, the vehicle control device according to the present invention will be described as an example applied to a drive unit for a hybrid vehicle. FIG. 1 is a diagram showing an overall structure of a vehicle 5 equipped with a vehicle drive unit 1 according to the present embodiment. As shown in this diagram, the vehicle drive unit 1 according to the present embodiment is arranged adjacent in the direction of width of the vehicle 5 to an engine E that is transversely mounted in the vehicle 5. In addition, an output gear O provided in the vehicle drive unit 1 is drivingly connected to front wheels of the vehicle 5 via a counter gear mechanism, a differential device, and so forth that are not shown. In the present embodiment, the vehicle 5 is also equipped with a rotary electric machine MG that can output a driving force. An output shaft of the rotary electric machine MG is drivingly connected to rear wheels of the vehicle 5. The vehicle 5 having the structure as described above provides a vehicle drive system that enables the vehicle to run basically by a rotational driving force of the engine E based on a front-engine front-drive (FF) system, and depending on the necessity, by assisting the rotational driving force of the engine E with a rotational driving force of the rotary electric machine MG based on a four-wheel drive (4WD) system. In this way, the vehicle 5 is provided with the front and rear wheels as wheels 6.

1. Structure of Vehicle Drive Unit

Figure 2:
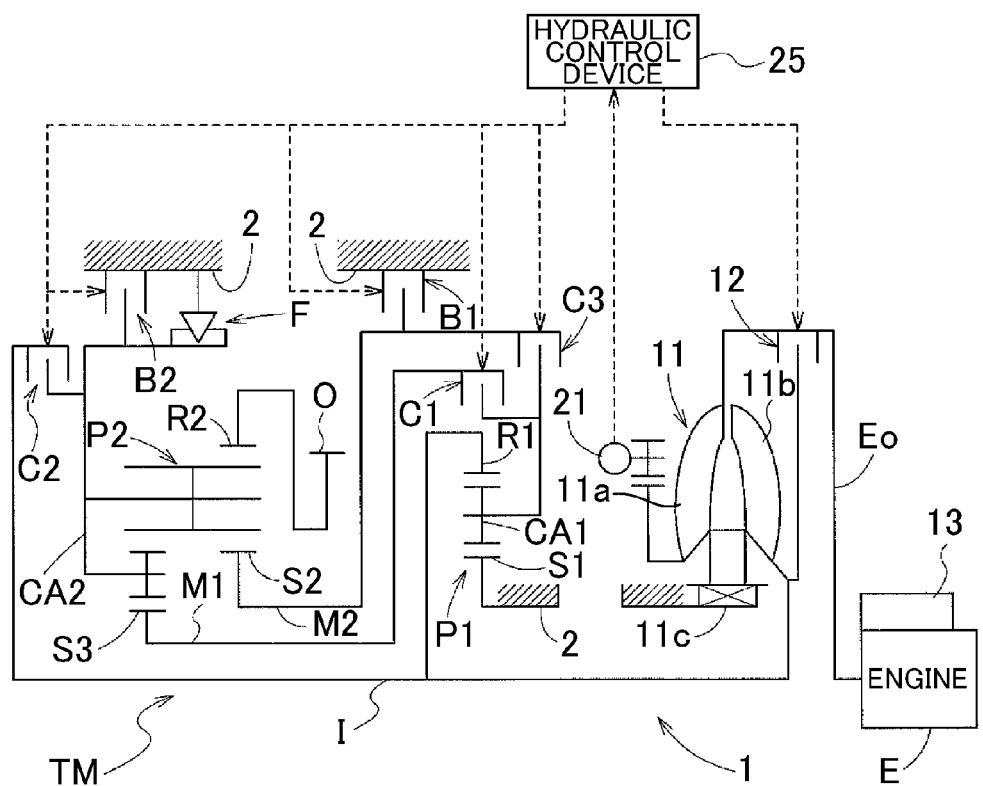
FIG. 2 is a schematic diagram showing a structure of the vehicle drive unit according to the first embodiment.

First of all, a structure of the vehicle drive unit 1 according to the present embodiment will be described. FIG. 2 is a schematic diagram showing the structure of a drive transmission system and a hydraulic control system of the vehicle drive unit 1 according to the present embodiment. Note that FIG. 2 shows the structure omitting some of axially symmetric parts. In this diagram, solid lines represent transmission paths of the driving force; dashed lines represent supply paths of hydraulic oil. As shown in the diagram, the vehicle drive unit 1 is structured so as to be drivingly connected to the engine E serving as a source of driving force for driving the vehicle, and to transmit the rotational driving force of the engine E received from an input shaft I via a torque converter 11, to the output gear O after changing speed in a transmission device TM. In the present embodiment, the input shaft I corresponds to an "input member" in the present invention, and the output gear O corresponds to an "output member" in the present invention.

As the engine E that is an internal-combustion engine driven by combustion of fuel, various known engines, such as a gasoline engine and a diesel engine, can be used. In the present example, an engine output shaft Eo such as a crankshaft of the engine E is drivingly connected to the input shaft I via the torque converter 11. The torque converter 11 is a device that transmits the rotational driving force of the engine output shaft Eo of the engine E serving as a source of driving force, to the transmission device TM via the input shaft I. The torque converter 11 is equipped with a pump impeller 11a serving as an input-side rotating member drivingly connected to the engine output shaft Eo, a turbine runner 11b serving as an output-side rotating member drivingly connected to the input shaft I, and a stator 11c provided between the pump impeller 11a and the turbine runner 11b and equipped with a one-way clutch. The torque converter 11 transmits the driving force between the pump impeller 11a on the driving side and the turbine runner 11b on the driven side, via hydraulic oil filled therein. With this arrangement, the rotational driving force of the engine E is transmitted to the input shaft I. It is also preferable to have a structure in which the engine output shaft Eo of the engine E is drivingly connected in an integrated manner to the input shaft I, or drivingly connected to the input shaft I via another member such as a damper or a clutch.

In the present embodiment, a starter 13 is provided adjacent to the engine E. The starter 13 is composed of a direct-current motor, etc., and electrically connected to a battery (not shown). The starter 13 is structured so as to be driven by power supplied from the battery to rotate the engine output shaft Eo while the engine E is stopped, thereby starting the engine E.

The torque converter 11 is provided with a lockup clutch 12 as a friction engagement element for lockup. The lockup clutch 12 is a clutch that connects the pump impeller 11a and the turbine runner 11b so as to rotate them as a unit in order to increase transmission efficiency by eliminating a rotational difference (slip) between the pump impeller 11a and the turbine runner 11b. Therefore, in the engaged state of the lockup clutch 12, the torque converter 11 transmits the driving force of the engine E directly to the input shaft I without involving the hydraulic oil. The torque converter 11 containing the lockup clutch 12 is supplied with the hydraulic oil at a pressure regulated by a hydraulic control device 25.

The transmission device TM is drivingly connected to the input shaft I that is drivingly connected to the turbine runner 11b serving as an output-side rotating member of the torque converter 11. The transmission device TM is a device that has a plurality of engagement elements, and transmits the rotational driving force of the engine E transmitted from the input shaft I, to the output gear O, at a speed changed at a speed ratio of each shift speed. Here, the transmission device TM is a stepped automatic transmission (stepwise variable transmission) having a plurality of shift speeds. In the present embodiment, the transmission device TM is provided with six shift speeds (a first speed, a second speed, a third speed, a fourth speed, a fifth speed, and a sixth speed) of different speed ratios (speed reduction ratios) as forward speeds. In order to provide these shift speeds, the transmission device TM is structured to have a gear mechanism provided with a first planetary gear unit P1 and a second planetary gear unit P2, and a plurality of engagement elements. By controlling engagement and disengagement of the plurality of engagement elements, the rotational state of each rotational element is switched and two of the plurality of engagement elements are selectively engaged with each other in the first planetary gear unit P1 and the second planetary gear unit P2, thereby switching the shift speed among the six shift speeds. Note that the transmission device TM is provided with one reverse speed in addition to the six shift speeds.

In the present embodiment, as shown in FIG. 2, the first planetary gear unit P1 is a single pinion type planetary gear mechanism arranged coaxially with the input shaft I. That is, the first planetary gear unit P1 is structured to have three rotational elements including a carrier CA1 supporting a plurality of pinion gears, and a sun gear S1 and a ring gear R1 meshing with the respective pinion gears. The second planetary gear unit P2 is a Ravigneaux type planetary gear mechanism arranged coaxially with the input shaft I. That is, the second planetary gear unit P2 is structured to have four rotational elements including two sun gears of a first sun gear S2 and a second sun gear S3, a ring gear R2, and a common carrier CA2 supporting a long pinion gear that meshes with both the first sun gear S2 and the ring gear R2 and a short pinion gear that meshes with the long pinion gear and the second sun gear S3.

The sun gear S1 of the first planetary gear unit P1 is fixed to a case 2 serving as a non-rotating member. The carrier CA1 is selectively drivingly connected via a first intermediate shaft M1 to the second sun gear S3 of the second planetary gear unit P2 so as to rotate as a unit therewith, and also selectively drivingly connected via a second intermediate shaft M2 to the first sun gear S2 of the second planetary gear unit P2 so as to rotate as a unit therewith. The ring gear R1 is drivingly connected to the input shaft I so as to rotate as a unit therewith. In the present embodiment, the sun gear S1, the carrier CA1, and the ring gear R1 in the first planetary gear unit P1 correspond to a "first rotational element," a "second rotational element," and a "third rotational element," respectively, in the present invention. Note that these three rotational elements can be arranged in the order of rotational speed as follows: the sun gear S1 (first rotational element), the carrier CA1 (second rotational element), and the ring gear R1 (third rotational element).

The first sun gear S2 of the second planetary gear unit P2 is selectively drivingly connected via the second intermediate shaft M2 to the carrier CA1 of the first planetary gear unit P1 so as to rotate as a unit therewith. The carrier CA2 is selectively drivingly connected to the input shaft I so as to rotate as a unit therewith, and selectively fixed to the case 2 serving as a non-rotating member. The ring gear R2 is drivingly connected to the output gear O so as to rotate as a unit therewith. The second sun gear S3 is selectively drivingly connected via the first intermediate shaft M1 to the carrier CA1 of the first planetary gear unit P1 so as to rotate as a unit therewith. In the present embodiment, the first sun gear S2, the carrier CA2, the ring gear R2, and the second sun gear S3 in the second planetary gear unit P2 correspond to a "first rotational element," a "second rotational element," a "third rotational element," and a "fourth rotational element," respectively, in the present invention. Note that these four rotational elements can be arranged in the order of rotational speed as follows: the first sun gear S2 (first rotational element), the carrier CA2 (second rotational element), the ring gear R2 (third rotational element), and the second sun gear S3 (fourth rotational element).

The carrier CA1 of the first planetary gear unit P1 is selectively drivingly connected to the first intermediate shaft M1 by a first clutch C1, and also to the second intermediate shaft M2 by a third clutch C3. With this arrangement, the carrier CA1 of the first planetary gear unit P1 is selectively drivingly connected to the second sun gear S3 of the second planetary gear unit P2 via the first clutch C1 and the first intermediate shaft M1, and also to the first sun gear S2 of the second planetary gear unit P2 via the third clutch C3 and the second intermediate shaft M2. In the present embodiment, the second intermediate shaft M2 is selectively fixed to the case 2 by a first brake B1. With this arrangement, the first sun gear S2 of the second planetary gear unit P2 is selectively drivingly connected to the carrier CA1 of the first planetary gear unit P1 via the second intermediate shaft M2 and the third clutch C3, and selectively fixed to the case 2 by the first brake B1.

The carrier CA2 of the second planetary gear unit P2 is selectively fixed to the case 2 by a one-way clutch F, and selectively drivingly connected to the input shaft I by a second clutch C2. Here, the one-way clutch F selectively fixes the carrier CA2 to the case 2 by preventing rotation in only one direction. The carrier CA2 of the second planetary gear unit P2 can also be selectively fixed to the case 2 by a second brake B2.

In the present embodiment, all of the first clutch C1, the second clutch C2, the third clutch C3, the first brake B1, and the second brake B2 are friction engagement elements. Specifically, each of them is composed of a multi-plate clutch or a multi-plate brake operated by hydraulic pressure. These friction engagement elements C1, C2, C3, B1, and B2 are controlled in engagement and disengagement by hydraulic pressure supplied from the hydraulic control device 25. The one-way clutch F is provided with an inner lace and an outer lace, and structured so as to allow the inner lace to rotate in the positive direction relative to the outer lace, but prevent the inner lace from rotating in the negative direction relative to the outer lace. In the present example, the inner lace is drivingly connected to the carrier CA2 of the second planetary gear unit P2 so as to rotate as a unit therewith, and the outer lace is fixed to the case 2. The one-way clutch F serves as a one-way engagement element that is placed in an engaged state to be prevented from rotating when the carrier CA2 of the second planetary gear unit P2 rotates in the negative direction, thereby selectively stopping the carrier CA2 by fixing it to the case 2. In the present embodiment, the "plurality of engagement elements" in the present invention are composed of the first clutch C1, the second clutch C2, the third clutch C3, the first brake B1, the second brake B2, and the one-way clutch F.

2. Structure of Hydraulic Control System

Next, the hydraulic control system of the vehicle drive unit 1 will be described. In the present embodiment, as shown in FIG. 2, the hydraulic control system is provided with a mechanical pump 21 as a source of hydraulic pressure for sucking hydraulic oil accumulated in an oil pan (not shown) to supply it to various parts of the vehicle drive unit 1. Here, the mechanical pump 21 is an oil pump that discharges hydraulic oil by being driven by the rotational driving force of the engine E serving as a source of driving force. For example, a gear pump or a vane pump can suitably be used as the mechanical pump 21 as described above. In the present example, the mechanical pump 21 is arranged on the opposite side of the engine E in the axial direction of the input shaft I relative to the torque converter 11. The mechanical pump 21 is drivingly connected to the engine output shaft Eo via the pump impeller 11a of the torque converter 11 to be driven by the rotational driving force of the engine E. The mechanical pump 21 is basically provided with a discharge capacity sufficiently exceeding the hydraulic oil flow rate required for the vehicle drive unit 1. However, the mechanical pump 21 does not discharge the hydraulic oil while the engine output shaft Eo is stopped (that is, while the engine E is stopped).

The hydraulic control system is also provided with the hydraulic control device 25 for regulating the pressure of the hydraulic oil supplied from the mechanical pump 21 to a predetermined pressure. Although detailed description is omitted here, the hydraulic control device 25 adjusts opening of one or two or more regulating valves based on signal pressure levels from linear solenoid valves for pressure regulation, thereby adjusting the amount of hydraulic oil drained from the regulating valves to regulate the pressure of the hydraulic oil to one or two or more predetermined pressure levels. The hydraulic oil regulated to the predetermined pressure levels is supplied to the lockup clutch 12, the torque converter 11, and the plurality of engagement elements C1, C2, C3, B1, and B2 of the transmission device TM, at respective required pressure levels. In addition, the hydraulic oil is supplied to gears of the first planetary gear unit P1 and the second planetary gear unit P2, and bearings (not shown) rotatably supporting the input shaft I, the first intermediate shaft M1, and the second intermediate shaft M2, in order to lubricate and cool these parts.

3. Operation of Vehicle Drive Unit

Figures 3, 4:
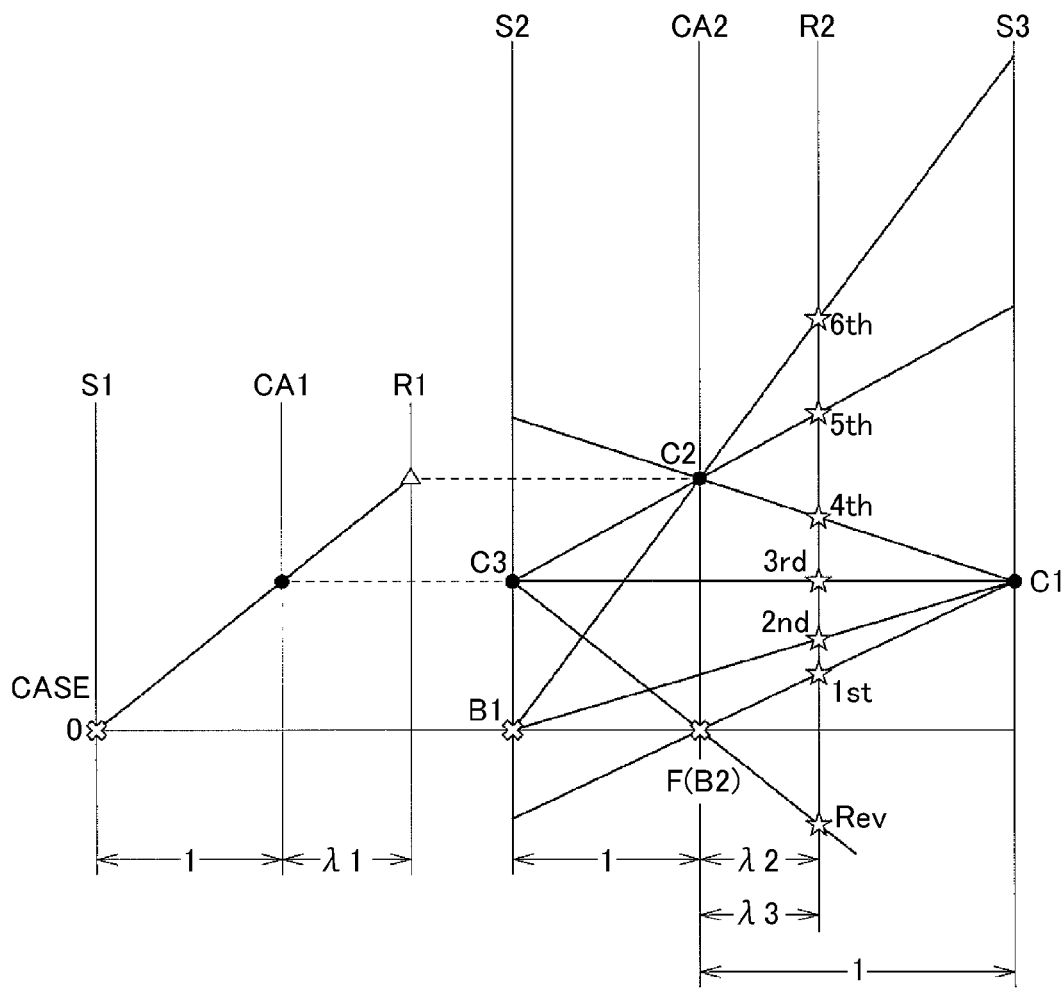
FIG. 3 is an operation table showing operating states of a plurality of engagement elements at each shift speed according to the first embodiment.
FIG. 4 is a velocity diagram of a transmission device according to the first embodiment.

Next, operation of the vehicle drive unit 1 according to the present embodiment will be described. Here, the six shift speeds achieved by the transmission device TM will be described in detail. FIG. 3 is an operation table showing operating states of the plurality of engagement elements at each of the shift speeds. In this figure, a mark "◯" indicates that the engagement element is in an engaged state, and no mark " " indicates that the engagement element is in a released (disengaged) state. A mark "Δ" indicates that the engagement element is in a released state when rotating in one direction (the carrier CA2 rotates in the positive direction), and in an engaged state when rotating in the other direction (the carrier CA2 rotates in the negative direction).

FIG. 4 is a velocity diagram of the transmission device TM. In this velocity diagram, the vertical axis corresponds to the rotational speed of each of the rotational elements. That is, a "0" marked corresponding to the vertical axis indicates that the rotational speed is zero, the upper side representing positive rotation (rotational speed is positive), and the lower side representing negative rotation (rotational speed is negative). Each of a plurality of vertical lines arranged in parallel corresponds to each of the rotational elements in the first planetary gear unit P1 and those in the second planetary gear unit P2. That is, an "S1", a "CA1", and an "R1" marked at the top of the vertical lines correspond to the sun gear S1, the carrier CA1, and the ring gear R1, respectively, in the first planetary gear unit P1. On the other hand, an "S2", a "CA2", an "R2", and an "S3" marked at the top of the vertical lines correspond to the first sun gear S2, the carrier CA2, the ring gear R2, and the second sun gear S3, respectively, in the second planetary gear unit P2. Each distance between the plurality of vertical lines arranged in parallel is determined based on each gear ratio λ (tooth number ratio between sun gear and ring gear= [number of teeth of sun gear]/[number of teeth of ring gear]) of the first planetary gear unit P1 and the second planetary gear unit P2.

A mark "Δ" indicates the state in which the rotational element with the mark is connected to the input shaft I that is drivingly connected to the engine E. A mark "X" indicates the state in which the rotational elements with the mark are each fixed to the case 2 by the first brake B1, the second brake B2, and the one-way clutch F. A mark "★" indicates the state in which the rotational element with the mark is connected to the output gear O that is drivingly connected to the wheels 6. Note that each of texts "1st", "2nd", "3rd", "4th", "5th", "6th", and "Rev" shown adjacent to each "★" corresponds to each of the first speed, the second speed, the third speed, the fourth speed, the fifth speed, the sixth speed, and the reverse speed, respectively, achieved in the transmission device TM.

As shown in FIGS. 3 and 4, the first speed is achieved by cooperation between the engagement of the first clutch C1 and the one-way clutch F. That is, in the state in which the first clutch C1 is engaged, the rotational driving force of the input shaft I (engine E) transmitted to the ring gear R1 of the first planetary gear unit P1 is transmitted to the second sun gear S3 of the second planetary gear unit P2 at a speed reduced based on a gear ratio λ1. In the present embodiment, the first clutch C1 corresponds to a "first engagement element" in the present invention. Then, in the state in which the first clutch C1 is engaged, when the rotational driving force from the input shaft I (engine E) to the output gear O is transmitted and the carrier CA2 of the second planetary gear unit P2 rotates in the negative direction, the one-way clutch F is engaged to be fixed to the case 2, and the rotational driving force of the second sun gear S3 is transmitted to the output gear O at a speed reduced based on a gear ratio λ3. Note that, when the rotational driving force from the output gear O to the input shaft I (engine E) is transmitted and the carrier CA2 of the second planetary gear unit P2 rotates in the positive direction, the one-way clutch F is disengaged. In the present embodiment, the one-way clutch F corresponds to a "unidirectional clutch" in the present invention. The first speed achieved as described above is a shift speed at which the rotational driving force from the input shaft I (engine E) to the output gear O is transmitted but the rotational driving force from the output gear O to the input shaft I (engine E) is not transmitted. In the present embodiment, the first speed corresponds to a "one-way transmission speed" in the present invention.

The second speed is achieved by cooperation between the engagement of the first clutch C1 and the engagement of the first brake B1. That is, in the state in which the first clutch C1 is engaged, the rotational driving force of the input shaft I (engine E) is transmitted to the second sun gear S3 of the second planetary gear unit P2 at a speed reduced based on the gear ratio λ1. In addition, in the state in which the first brake B1 is engaged, the first sun gear S2 of the second planetary gear unit P2 is fixed to the case 2. Then, the rotational driving force of the second sun gear S3 is transmitted to the output gear O at a speed further reduced based on a gear ratio λ2 and the gear ratio λ3.

The third speed is achieved by cooperation between the engagement of the first clutch C1 and the engagement of the third clutch C3. That is, in the state in which the first clutch C1 is engaged, the rotational driving force of the input shaft I (engine E) is transmitted to the second sun gear S3 of the second planetary gear unit P2 at a speed reduced based on the gear ratio λ1. In addition, in the state in which the third clutch C3 is engaged, the rotational driving force of the input shaft I (engine E) is transmitted to the first sun gear S2 of the second planetary gear unit P2 at a speed reduced based on the gear ratio λ1. Then, because the first sun gear S2 and the second sun gear S3 rotate at the same speed as each other, the rotational driving force of the input shaft I (engine E) with the speed reduced based on the gear ratio λ1 is directly transmitted to the output gear O.

The fourth speed is achieved by cooperation between the engagement of the first clutch C1 and the engagement of the second clutch C2. That is, in the state in which the first clutch C1 is engaged, the rotational driving force of the input shaft I (engine E) is transmitted to the second sun gear S3 of the second planetary gear unit P2 at a speed reduced based on the gear ratio λ1. In addition, in the state in which the second clutch C2 is engaged, the rotational driving force of the input shaft I (engine E) is directly transmitted to the carrier CA2 of the second planetary gear unit P2. Then, the rotational driving force of the input shaft I (engine E) determined based on the rotational speeds of the carrier CA2 and the second sun gear S3 as well as on the gear ratio λ3 is transmitted to the output gear O.

The fifth speed is achieved by cooperation between the engagement of the second clutch C2 and the engagement of the third clutch C3. That is, in the state in which the second clutch C2 is engaged, the rotational driving force of the input shaft I (engine E) is directly transmitted to the carrier CA2 of the second planetary gear unit P2. In addition, in the state in which the third clutch C3 is engaged, the rotational driving force of the input shaft I (engine E) is transmitted to the first sun gear S2 of the second planetary gear unit P2 at a speed reduced based on the gear ratio $\lambda 1$. Then, the rotational driving force of the input shaft I (engine E) determined based on the rotational speeds of the first sun gear S2 and the carrier CA2 as well as on the gear ratio $\lambda 2$ is transmitted to the output gear O.

The sixth speed is achieved by cooperation between the engagement of the second clutch C2 and the engagement of the first brake B1. That is, in the state in which the second clutch C2 is engaged, the rotational driving force of the input shaft I (engine E) is directly transmitted to the carrier CA2 of the second planetary gear unit P2. In addition, in the state in which the first brake B1 is engaged, the first sun gear S2 of the second planetary gear unit P2 is fixed to the case 2. Then, the rotational driving force of the carrier CA2 is transmitted to the output gear O at a speed increased based on the gear ratio $\lambda 2$.

The reverse speed is achieved by cooperation between the engagement of the third clutch C3 and the engagement of the second brake B2. That is, in the state in which the third clutch C3 is engaged, the rotational driving force of the input shaft I (engine E) is transmitted to the first sun gear S2 of the second planetary gear unit P2 at a speed reduced based on the gear ratio $\lambda 1$. In addition, in the state in which the second brake B2 is engaged, the carrier CA2 of the second planetary gear unit P2 is fixed to the case 2. Then, the rotational driving force of the first sun gear S2 is transmitted to the output gear O at a speed reduced based on the gear ratio $\lambda 2$ and with the direction of rotation reversed.

As described above, the transmission device TM according to the present embodiment is provided with the first speed, the second speed, the third speed, and the fourth speed as shift speeds achieved at least by engaging the first clutch C1 serving as a first engagement element. Moreover, the transmission device TM is provided with the fourth speed, the fifth speed, and the sixth speed as shift speeds achieved at least by engaging the second clutch C2 that is one of the engagement elements different from the first clutch C1. In the present embodiment, the second clutch C2 corresponds to a "second engagement element" in the present invention. The shift speeds described above can be arranged in the descending order of speed ratio (speed reduction ratio) between the input shaft I (engine E) and the output gear O as follows: the first speed, the second speed, the third speed, the fourth speed, the fifth speed, and the sixth speed. Consequently, the first speed serving as the one-way transmission speed is a shift speed with the largest speed ratio (speed reduction ratio) among the forward shift speeds.

4. Structure of Control Unit

Figure 5:
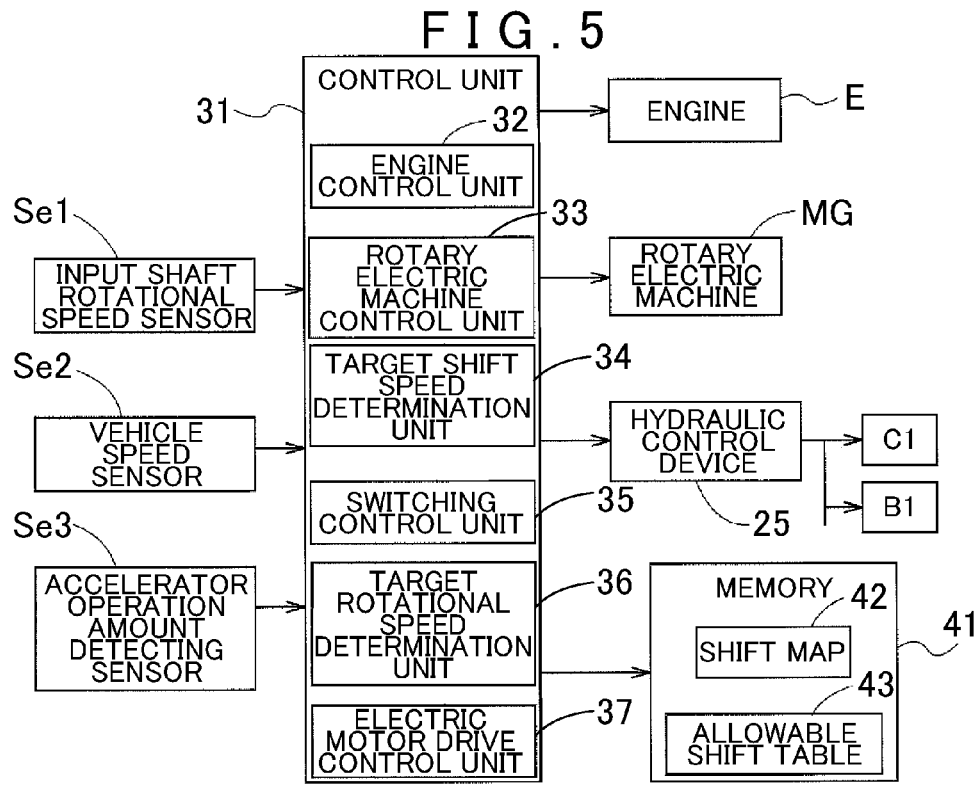
FIG. 5 is a block diagram showing a structure of a control unit according to the first embodiment.

Next, a structure of a control unit 31 according to the present embodiment will be described. As shown in FIG. 5, the control unit 31 provided in the vehicle drive unit 1 functions as a core member to control operations of various parts of the vehicle drive unit 1. The control unit 31 is provided with an arithmetic processing unit such as a CPU as a core member, and structured to have storage units such as a RAM (random access memory) structured so as to be able to read/write data from/to the arithmetic processing unit, a ROM (read-only memory) structured so as to be able to read data from the arithmetic processing unit, and so forth (not shown).

Functional units 32 to 37 of the control unit 31 are structured by software (programs) stored in the ROM, etc., or hardware such as separately provided operational circuits, or the both. The functional units 32 to 37 are structured so as to be able to send/receive information to/from each other. A memory 41 has, as a hardware structure, a recording medium, such as a flash memory, capable of storing and rewriting information, and is structured so as to be able to send/receive information to/from the control unit 31. Note that the memory 41 may be provided in the storage unit included in the control unit 31.

The transmission device TM is also provided with a plurality of sensors, specifically an input shaft rotational speed sensor Se1, a vehicle speed sensor Se2, and an accelerator operation amount detecting sensor Se3, installed at various parts of the vehicle 5. Here, the input shaft rotational speed sensor Se1 is a sensor that detects the rotational speed of the input shaft I. The vehicle speed sensor Se2 is a sensor that detects a rotational speed of the wheels 6, that is, a vehicle speed. The accelerator operation amount detecting sensor Se3 is a sensor that detects an accelerator operation amount by detecting an operation amount of an accelerator pedal (not shown). The information indicating the results of detection by the sensors Se1 to Se3 is output to the control unit 31.

As shown in FIG. 5, the control unit 31 is provided with an engine control unit 32, a rotary electric machine control unit 33, a target shift speed determination unit 34, a switching control unit 35, a target rotational speed determination unit 36, and an electric motor drive control unit 37. A shift map 42 and an allowable shift table 43 are stored in the memory 41 referred to by the functional units 32 to 37 of the control unit 31. The functional units 32 to 37 of the control unit 31 will be described below in detail. Note that, in the present embodiment, the control unit 31 corresponds to the "vehicle control device" in the present invention. Note also that the functional units 32 to 37 included in the control unit 31 cooperate with each other to compose "a control unit" in the present invention.

The engine control unit 32 is a functional unit that controls operations of the engine E. The engine control unit 32 determines an engine operating point, and performs processing to control the engine E so as to operate at the engine operating point. Here, the engine operating point is a control command value representing a control target point of the engine E, and defined by a rotational speed and a torque. More in detail, the engine operating point is a command value representing a control target point of the engine E determined by considering a vehicle required output (defined based on a vehicle required torque and the engine rotational speed) and an optimal fuel consumption level, and is defined by a rotational speed command value and a torque command value. Then, the engine control unit 32 controls the engine E so as to operate at the torque and the rotational speed specified for the engine operating point.

In addition, the engine control unit 32 is structured to perform idle control for controlling the engine rotational speed to a predetermined idle speed when it is judged that the rotational speed of the engine E has decreased to near the predetermined idle speed and the accelerator operation amount is zero. In the present embodiment, the engine control unit 32 is structured to also perform the idle control when the rotational speed of the engine E has decreased to near the predetermined idle speed, if a running idle condition to be described later is satisfied, that is, if the accelerator operation amount is within a predetermined range set in the vicinity of zero while the vehicle is running.

The rotary electric machine control unit 33 is a functional unit that controls operations of the rotary electric machine MG. The rotary electric machine control unit 33 determines a rotary electric machine operating point, and performs processing to control the rotary electric machine MG so as to operate at the rotary electric machine operating point. Here, the rotary electric machine operating point is a control command value representing a control target point of the rotary electric machine MG, and defined by a rotational speed and a torque. More in detail, the rotary electric machine operating point is a command value representing a control target point of the rotary electric machine MG determined by considering the vehicle required output and the engine operating point, and is defined by a rotational speed command value and a torque command value. Then, the rotary electric machine control unit 33 controls the rotary electric machine MG so as to operate at the torque and the rotational speed specified for the rotary electric machine operating point. In addition, the rotary electric machine control unit 33 performs control for switching between a state in which the rotary electric machine MG produces a driving force with electric power supplied from the battery (not shown) and a state in which the rotary electric machine MG generates electric power with the rotational driving force of the engine E. Moreover, the rotary electric machine control unit 33 performs regeneration control while the vehicle 5 is running.

Figure 6:
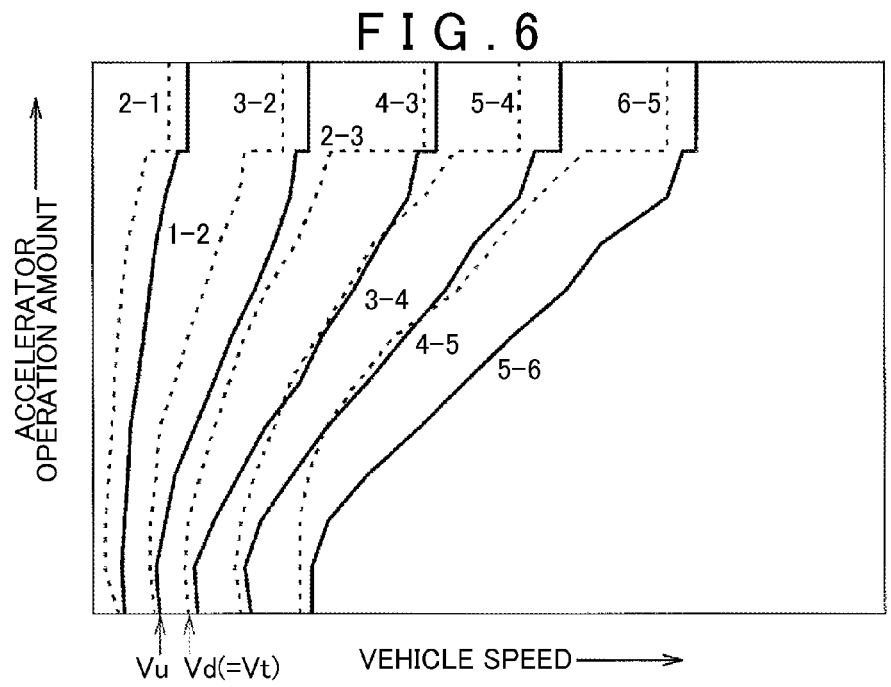
FIG. 6 is a diagram showing an example of a shift map according to the first embodiment.

The target shift speed determination unit 34 is a functional unit that determines a target shift speed in the transmission device TM based on the accelerator operation amount and the vehicle speed of the vehicle 5. In order to determine such a target shift speed, the target shift speed determination unit 34 refers to the shift map 42 stored in the memory 41. FIG. 6 is a diagram showing an example of the shift map 42 according to the present embodiment. The shift map 42 is a map in which shift schedules for the shift speeds in the transmission device TM are set based on the accelerator operation amount and the vehicle speed. As shown in the diagram, the shift map 42 is provided with a plurality of upshift lines and a plurality of downshift lines represented by generally upward-sloping straight lines (with the accelerator operation amount increasing as the vehicle speed increases). Here, the upshift line is a line specifying a transition schedule from a shift speed of a larger speed ratio (speed reduction ratio) to a shift speed of a smaller speed ratio (speed reduction ratio). On the other hand, the downshift line is a line specifying a transition schedule from a shift speed of a smaller speed ratio (speed reduction ratio) to a shift speed of a larger speed ratio (speed reduction ratio). The target shift speed determination unit 34 determines the target shift speed based on the vehicle speed information obtained by the vehicle speed sensor Se2, the accelerator operation amount information obtained by the accelerator operation amount detecting sensor Se3, and the shift map 42. The target shift speed information thus determined is output to the switching control unit 35.

The switching control unit 35 is a functional unit that performs control for switching the shift speed of the transmission device TM by controlling operations of the engagement elements C1, C2, C3, B1, and B2 based on the target shift speed determined by the target shift speed determination unit 34. That is, the switching control unit 35 performs control, as normal switching control, that supplies the hydraulic oil via the hydraulic control device 25 to two engagement elements corresponding to the determined target shift speed to place the engagement elements in an engaged state, thereby achieving the target shift speed. If the vehicle speed and the accelerator operation amount change to cross the upshift line or the downshift line on the shift map 42 of FIG. 6, the target shift speed determination unit 34 determines a new target shift speed in the transmission device TM based on the accelerator operation amount and the vehicle speed after the change. Then, the switching control unit 35 supplies the hydraulic oil to two engagement elements corresponding to the newly determined target shift speed to place the engagement elements in an engaged state, thereby achieving the new target shift speed.

In the present embodiment, the switching control unit 35 is structured to perform, in addition to the normal switching control, clutch release control during transition to a running idle state, as well as clutch re-engagement control and shifting transition control during transition from the running idle state. The running idle state and various control processes such as the clutch release control, the clutch re-engagement control, and the shifting transition control will be described below.

The running idle state is a state in which the vehicle 5 is running and the rotational speed of the engine E is controlled to the predetermined idle speed while the rotational driving force of the input shaft I is not transmitted to the output gear O.

In the present embodiment, transitioning to the running idle state occurs when a predetermined running idle condition is satisfied, and transitioning from the running idle state occurs when the condition is no longer satisfied. After transitioning from the running idle state, the state returns to the normal state in which the rotational driving force of the input shaft I is transmitted to the output gear O.

The predetermined running idle condition is a condition determined based at least on the vehicle speed and the accelerator operation amount. For example, conditions for satisfying the predetermined running idle condition are defined as follows: the vehicle speed is a predetermined vehicle speed or more, and the accelerator operation amount is within a predetermined range set depending on the vehicle speed. Here, the predetermined range of the accelerator operation amount is specified as a predetermined range in the vicinity where the accelerator operation amount is zero, being set so as to correspond to a range of the accelerator operation amount when a deceleration command is issued by a driver. The predetermined vehicle speed is set to a vehicle speed at which the rotational driving force of the input shaft I produced by the engine E is not transmitted to the output gear O, in the state in which the first speed is achieved in the transmission device TM after transitioning to the running idle state. Specifically, a rotational speed of the output gear O is determined as a rotational speed obtained by dividing the predetermined idle speed in the running idle state by the speed ratio of the first speed, and the rotational speed of the output gear O thus determined is converted to a vehicle speed, which is then set as the predetermined vehicle speed.

As described above, the engine control unit 32 is structured to also perform the idle control if the running idle condition is satisfied, that is, if the accelerator operation amount is within the predetermined range set in the vicinity of zero while the vehicle is running. During transition to the running idle state, when the clutches of the transmission device TM are disengaged by the clutch release control to be described later, and the rotational speed of the engine E is reduced, the engine control unit 32 controls the rotational speed of the engine E to the predetermined idle speed.

In the clutch release control, the switching control unit 35 controls the transmission device TM so as to achieve the first speed in the running idle state under a predetermined condition. That is, the switching control unit 35 supplies the hydraulic oil via the hydraulic control device 25 to the first clutch C1 to control the first clutch C1 so as to be engaged. In addition, the switching control unit 35 stops the supply of the hydraulic oil to the engagement elements other than the first clutch C1 to disengage the engagement elements other than the first clutch C1. As a result, the first speed is achieved by cooperation between the engagement of the first clutch C1 and the one-way clutch F.

Here, as conditions for the switching control unit 35 to control the transmission device TM in the running idle state so as to achieve the first speed, a first condition and a second condition described below are set to be satisfied in the present embodiment. The first condition is set such that the shift speed in the transmission device TM before transitioning to the running idle state is a shift speed achieved at least by engaging the first clutch C1. In the present example, the first condition is satisfied if a shift speed before transitioning to the running idle state is any one of the first to fourth speeds. The second condition is set such that the vehicle speed obtained by the vehicle speed sensor Se2 before transitioning to the running idle state is a predetermined disengagement threshold value Vt or less. In the present example, as shown in FIG. 6, the predetermined disengagement threshold value Vt is set to be equal to a vehicle speed Vd for downshift from the fourth speed to the third speed in the state of the near-zero accelerator operation amount. Note that the disengagement threshold value Vt (=Vd) has a greater value than that of a vehicle speed Vu for upshift from the second speed to the third speed in the state of the near-zero accelerator operation amount. Consequently, in the present example, the second condition is satisfied if the shift speed before transitioning to the running idle state is any one of the first to third speeds in the state of the near-zero accelerator operation amount. Therefore, in the present embodiment, the switching control unit 35 controls the transmission device TM so as to achieve the first speed if the shift speed before transitioning to the running idle state is any one of the first to third speeds.

Because the engine E is rotated in the running idle state, the mechanical pump 21 is rotationally driven to discharge the hydraulic oil of a predetermined pressure. The hydraulic oil of the predetermined pressure discharged by driving the mechanical pump 21 is supplied via the hydraulic control device 25 to the first clutch C1 of the transmission device TM to engage the first clutch C1, thereby achieving the first speed. Consequently, the vehicle drive unit 1 requires no power source (such as an electric pump) besides the engine E in order to achieve the first speed by engaging the first clutch C1 in the running idle state, thereby suppressing the structure of the vehicle drive unit 1 from being complicated.

As described above, in the present embodiment, the first speed is the one-way transmission speed at which the rotational driving force from the input shaft I (engine E) to the output gear O is transmitted but the rotational driving force from the output gear O to the input shaft I (engine E) is not transmitted. At the one-way transmission speed, the rotational driving force is not transmitted from the output gear O to the input shaft I. Therefore, even if the rotational driving force of the wheels 6 is transmitted to the transmission device TM via the output gear O, the rotational driving force of the wheels 6 is cut off by the transmission device TM, and therefore is not transmitted to the engine E via the input shaft I. Consequently, drag of the engine E (engine brake, or co-rotation of the engine E together with the input shaft I) in the running idle state is avoided. As a result, in the running idle state, because the rotary electric machine MG can use the rotational driving force transmitted from the wheels 6 to perform regenerative braking while an energy loss due to the drag of the engine E is suppressed, the efficiency of regeneration by the rotary electric machine MG can be improved.

On the other hand, the rotational driving force is transmitted from the input shaft I to the output gear O at the one-way transmission speed. Therefore, when transitioning from the running idle state to drive the vehicle 5 with the rotational driving force of the engine E, the rotational driving force of the engine E can promptly be transmitted to the output gear O (wheels 6) via the input shaft I. In addition, because the engine E is not stopped in the running idle state, the rotational driving force of the engine E can promptly be transmitted to the output gear O after transitioning from the running idle state.

Therefore, with the vehicle drive system provided with the vehicle control device according to the present embodiment, response in the driving force transmission can be improved when transitioning from the running idle state to drive the vehicle with the rotational driving force of the engine E, while improving a regeneration efficiency of the rotary electric machine MG in the running idle state.

The situation of transition to the running idle state often occurs when the vehicle 5 is decelerating. In such a situation, because the vehicle 5 must be driven from the state of a low (particularly, near-zero) vehicle speed when driven to transition from the running idle state, a large driving force is often required. In the present embodiment, the first speed that is a shift speed having the largest speed ratio (speed reduction ratio) is set as the one-way transmission speed. Therefore, even in the case of driving the vehicle 5 from the state of the low (particularly, near-zero) vehicle speed, the rotational driving force of the input shaft I (engine E) can be transmitted at a reduced speed, thus transmitting a large driving force to the output gear O (wheels 6) with a good response.

Generally, an excessively large engine brake force is often generated when an accelerator is turned off because the first speed has a large speed ratio (speed reduction ratio). Therefore, in order to reduce a shock caused by such an engine brake, there is a case of using a one-way clutch when achieving the first speed. In the present embodiment, because the one-way clutch provided for that purpose can be also used as the one-way clutch F for achieving the one-way transmission speed in the present invention, the one-way transmission speed can be achieved without adding any special parts.

On the other hand, if one or both of the first and the second conditions described above are not satisfied, the switching control unit 35 controls the transmission device TM to disengage all of the engagement elements thereof in the running idle state. That is, if the shift speed in the transmission device TM before transitioning to the running idle state is a shift speed other than the shift speed achieved at least by engaging the first engagement element, or if the vehicle speed obtained by the vehicle speed sensor Se2 before transitioning to the running idle state is greater than the predetermined disengagement threshold value Vt, the switching control unit 35 controls the transmission device TM to achieve a neutral speed by disengaging all of the engagement elements including the first clutch C1. In the present embodiment, the switching control unit 35 controls the transmission device TM to achieve the neutral speed if the shift speed before transitioning to the running idle state is any one of the fourth to sixth speeds. In this way, if one or both of the first and the second conditions are not satisfied, the neutral speed is achieved in the transmission device TM, thus increasing the degree of freedom of setting of the shift speed in the transmission device TM when transitioning from the running idle state, and thereby enabling an appropriate response depending on the situation.

The clutch re-engagement control is a control process executed when transitioning from the running idle state. In the clutch re-engagement control, in order to achieve a target shift speed in the transmission device TM when transitioning from the running idle state, the switching control unit 35 sequentially engages two of the engagement elements corresponding to the target shift speed. In the present embodiment, as described above, either the first speed serving as a one-way transmission speed is achieved, or the neutral speed in which all of the engagement elements are disengaged is achieved, as the shift speed in the transmission device TM in the running idle state.

Here, if the first speed has been achieved in the transmission device TM, that is, if the shift speed before transitioning to the running idle state has been any one of the first to third speeds, the first clutch C1 serving as the first engagement element is already engaged. Therefore, the switching control unit 35 achieves the target shift speed by performing control so as to engage the engagement element other than the first clutch C1 corresponding to the target shift speed.

On the other hand, if the neutral speed has been achieved in the transmission device TM, that is, if the shift speed before transitioning to the running idle state has been any one of the fourth to sixth speeds, the switching control unit 35 achieves the target shift speed by performing control so as to engage first the second clutch C2 serving as the second engagement element, and then the engagement element other than the second clutch C2 corresponding to the target shift speed.

In the present embodiment, if the neutral speed has been achieved in the running idle state, the second clutch C2 that is to be engaged first is engaged when the rotational speed of the input shaft I reaches a predetermined engagement starting speed or more.

In the present embodiment, among the two engagement elements to be engaged, the engagement element, which is to be engaged later and which is other than either of the first clutch C1 and the second clutch C2, is engaged after engine rotational speed control is performed. Here, the engine rotational speed control is a control process for controlling the engine E so that the rotational speed of the input shaft I coincides with a predetermined target rotational speed. The target rotational speed is determined based on the running speed of the vehicle 5 and the target shift speed in the transmission device TM when transitioning from the running idle state. That is, based on the running speed of the vehicle 5 and the gear ratio of the target shift speed, the target rotational speed of the input shaft I is determined so that the relative rotational speed is zero or very near to zero between two members (for example, the carrier CA1 of the first planetary gear unit P1 and the first intermediate shaft M1 if the third clutch C3 is to be engaged, or the case 2 and the second intermediate shaft M2 if the first brake B1 is to be engaged) to be connected by engaging with each other in the engagement element to be engaged later. In the present example, the target rotational speed determination unit 36 determines the target rotational speed as described above by calculation based on the vehicle speed obtained by the vehicle speed sensor Se2 and the gear ratio of the target shift speed. Specifically, the target rotational speed determination unit 36 obtains the rotational speed of the output gear O by converting the vehicle speed thereto, and multiplies the rotational speed of the output gear O by the speed ratio of the target shift speed to obtain a rotational speed, which is then determined as the target rotational speed. Then, the engine control unit 32 issues a rotational speed command value corresponding to the target rotational speed thus determined, thereby controlling the engine E so that the rotational speed of the input shaft I coincides with the target rotational speed. After that, the engagement element other than either of the first clutch C1 and the second clutch C2 is engaged. In this way, by controlling the predefined engagement elements so as to be engaged after the two rotational elements are synchronized with each other (after the rotational speeds become approximately equal to each other) by the engine rotational speed control, a shift shock can be suppressed from occurring when the target shift speed is achieved.

In the case in which the first speed has been achieved in the running idle state, if the target shift speed when transitioning from the running idle state is any one of the fourth to sixth speeds, the switching control unit 35 first achieves the third speed by engaging the third clutch C3 in the state in which the first clutch C1 is already engaged. Then, the switching control unit 35 controls the two engagement elements corresponding to the target shift speed to be engaged, thus achieving the target shift speed via the third speed.

In the case in which the neutral speed has been achieved in the running idle state, if the target shift speed when transitioning from the running idle state is any one of the first to third speeds, the switching control unit 35 first achieves the fourth speed by engaging the second clutch C2 and then the first clutch C1. Then, the switching control unit 35 controls the engagement element, of the two engagement elements corresponding to the target shift speed, other than the first clutch C1 to be engaged, thus achieving the target shift speed via the fourth speed.

When the target shift speed is changed to a new shift speed before the original target shift speed at the time of transitioning from the running idle state is achieved, the switching control unit 35 basically performs the engine rotational speed control, and then switches the engagement state of each engagement element so that the target shift speed before the change is achieved by engaging the engagement element to be engaged later, and then the new target shift speed after the change is achieved. However, if the target shift speed is changed to a new shift speed after the first clutch C1 or the second clutch C2 has been engaged first, and if the changing pattern of the target shift speed corresponds to a predetermined allowable shift pattern, the switching control unit 35 performs the shifting transition control described below as an exceptional process, in order to achieve early the new target shift speed after the change.

In the shifting transition control, the engine rotational speed control is stopped because the engine control unit 32 stops issuing the rotational speed command value corresponding to the target rotational speed, and the switching control unit 35 engages the engagement elements corresponding to the target shift speed after the change in the transmission device TM in order to achieve the target shift speed after the change. Here, the allowable shift pattern is a changing pattern corresponding to a change between shift speeds in which the engagement elements engaged first are common and the engagement elements engaged later are different, and also to a change (downshift) from a shift speed with a small speed reduction ratio to a shift speed with a large speed reduction ratio.

In the present embodiment, as described above, the engagement element engaged first is the first clutch C1 serving as the first engagement element or the second clutch C2 serving as the second engagement element. The first speed, the second speed, and the third speed are provided as the shift speeds achieved by engaging the first clutch C1. The fourth speed, the fifth speed, and the sixth speed are provided as the shift speeds achieved by engaging the second clutch C2. Therefore, in the present example, a downshift between two of the first to third shift speeds and a downshift between two of the fourth to sixth shift speeds are allowable changing patterns. That is, the allowable shift patterns include the following six patterns: from the second to the first speed, from the third to the second speed, from the third to the first speed, from the fifth to the fourth speed, from the sixth to the fifth speed, and from the sixth to the fourth speed.

Moreover, in the present embodiment, when making a downshift from the fifth speed or the sixth speed to any one of the first to third speeds, the shift speed is changed to the target shift speed via the fourth speed, as described above. Accordingly, the allowable shift patterns further include the following six patterns: from the fifth to the first speed, from the fifth to the second speed, from the fifth to the third speed, from the sixth to the first speed, from the sixth to the second speed, and from the sixth to the third speed. Consequently, in the present example, a total of twelve changing patterns are set as the allowable shift patterns. These allowable shift patterns are stored in the memory 41 as the allowable shift table 43. In addition, it is structured such that, when the target shift speed is changed to a new shift speed before the original target shift speed at the time of transitioning from the running idle state is achieved (specifically, after the first clutch C1 or the second clutch C2 is engaged and before the engagement element to be engaged later is completely engaged), the allowable shift table 43 is referred to so as to be able to determine whether the shifting transition control is to be performed.

In that case, the switching control unit 35 switches the engagement element to be engaged later from the engagement element corresponding to the target shift speed before the change to the engagement element corresponding to the target shift speed after the change, while maintaining in the engaged state the first clutch C1 or the second clutch C2 that has been engaged first, thereby achieving the target shift speed after the change. In the present embodiment, it is structured such that the above-described engine rotational speed control is not executed when engaging the predefined engagement elements corresponding to the target shift speed after the change. Here, the hydraulic oil according to a predetermined command signal is supplied via the hydraulic control device 25 to engage the predefined engagement elements corresponding to the target shift speed after the change.

5. Procedure of Control Processing

Next, the contents of control of the vehicle drive unit 1 according to the present embodiment will be described. FIG. 7 is a flowchart showing an overall processing procedure of the switching control process of the vehicle drive unit 1 according to the present embodiment. FIG. 8 is a flowchart showing a processing procedure of the clutch release control according to step #06 in FIG. 7. FIG. 9 is a flowchart showing a processing procedure of the clutch re-engagement control according to step #08 in FIG. 7. The control processing procedures of the vehicle drive unit 1 described below are executed by the functional units 32 to 37 of the control unit 31. If the functional units 32 to 37 of the control unit 31 are constituted by programs, the arithmetic processing unit provided in the control unit 31 operates as a computer executing the programs constituting the functional units 32 to 37.

5-1. Overall Procedure of Switching Control Process

In shift control processing according to the present embodiment, first of all, the running speed (vehicle speed) of the vehicle 5 is obtained by receiving an output signal from the vehicle speed sensor Se2 (step #01), and the accelerator operation amount is obtained by receiving an output signal from the accelerator operation amount detecting sensor Se3 (step #02). Note that the order of obtaining these information items is not limited. Next, the target shift speed determination unit 34 determines the target shift speed based on the obtained information items of the vehicle speed and the accelerator operation amount, and on the shift map 42 stored in the memory 41 (step #03). Based on the target shift speed thus determined, the switching control unit 35 switches the shift speed of the transmission device TM by controlling operations of the engagement elements, thus performing normal shift control (step #04). In addition, it is judged whether or not a running idle request has been turned on due to satisfaction of the predetermined running idle condition (step #05). If the running idle request is judged as not on, that is, off (step #05: No), the process returns to the step #01 and repeats the steps #01 to #05.

On the other hand, if the running idle request is judged as on (step #05: Yes), the clutch release control is executed (step #06). The detailed processing procedure of the clutch release control will be described based on the flowchart in FIG. 8. Note that, after the running idle request is judged as on, the engine control unit 32 starts the idle control in the running idle state. In the state after transitioning to the running idle state due to the running idle request, it is then judged whether or not the running idle request has been turned off because the predetermined running idle condition is no longer satisfied (step #07). If the running idle request is judged to have been turned off (step #07: Yes), the clutch re-engagement control is executed (step #08). Note that, after the running idle request is judged to have been turned off, the engine control unit 32 terminates the idle control in the running idle state, and starts the control that operates the engine E at the operating point of the torque and the rotational speed. Then, the process returns to the step #01, and repeats the processing of the steps #01 to #08 in a sequential manner while the vehicle 5 is running.

Here, the judgment as to whether or not the running idle request is turned on is made based at least on the vehicle speed and the accelerator operation amount, as in the case of the predetermined running idle condition described above. For example, the condition for turning on the running idle request is defined such that the vehicle speed is a predetermined vehicle speed or more, and the accelerator operation amount is within the above-described predetermined range set depending on the vehicle speed.

On the other hand, the judgment as to whether or not the running idle request is turned off is made based at least on the vehicle speed and the accelerator operation amount, as in the case of the predetermined running idle condition. In the present example, the condition for turning off the running idle request is defined, for example, such that the accelerator operation amount has become out of the predetermined range set depending on the vehicle speed.

Note that, as described above, when the accelerator operation amount has fallen within the predetermined range and the rotational speed of the engine E has come close to the predetermined idle speed, the engine control unit 32 performs the idle control even during running.

5-2. Processing Procedure of Clutch Release Control

Next, the detailed processing procedure of the clutch release control according to the step #06 will be described. In the clutch release control, first of all, it is judged whether or not both the first and the second conditions are satisfied. In the present embodiment, specifically, it is judged whether or not the shift speed when the state of the engine E is changed to the running idle state has been any one of the first to third speeds (step #21). If the shift speed is judged to have been one of the first to third speeds (step #21: Yes), the switching control unit 35 disengages the engagement element (for example, the first brake B1 at the second speed, or the third clutch C3 at the third speed) other than the first clutch C1 (step #22). In this state, the first clutch C1 is maintained in the engaged state by the pressure of the hydraulic oil discharged by the mechanical pump 21 driven by rotation of the engine E. Then, the first speed serving as the one-way transmission speed is achieved by cooperation between the engagement of the first clutch C1 and the one-way clutch F.

On the other hand, if the shift speed is judged to have been not any one of the first to third speeds, that is, to have been one of the fourth to sixth speeds (step #21: No), the switching control unit 35 disengages all of the engagement elements including the first clutch C1 (step #23). In this state, the neutral speed is achieved. In this way, in the running idle state, the shift speed of the transmission device TM is maintained to be the first speed or the neutral speed that is achieved depending on the shift speed when transitioning to the running idle state (step #24). Thus, the clutch release control ends.

5-3. Processing Procedure of Clutch Re-Engagement Control

Next, the detailed processing procedure of the clutch re-engagement control according to the step #08 will be described. In the clutch re-engagement control, first of all, it is judged whether or not the shift speed of the transmission device TM in the running idle state is the first speed (step #41). If the shift speed is judged to be the first speed (step #41: Yes), then it is judged whether or not the target shift speed at the time when the running idle request has been judged as turned off is the first speed (step #42). If the target shift speed is judged to be the first speed (step #42: Yes), the clutch re-engagement control ends because the first speed is already achieved. On the other hand, if the target shift speed is judged to be not the first speed (step #42: No), the process proceeds to a process of step #46 to be described later in order to engage the engagement element other than the first clutch C1.

In step #41, if the shift speed of the transmission device TM in the running idle state is judged to be not the first speed, that is, to be the neutral speed (step #41: No), the rotational speed of the input shaft I is obtained by the input shaft rotational speed sensor Se1 (step #43). In addition, it is judged whether or not the rotational speed of the input shaft I thus obtained is equal to or more than the predetermined engagement starting speed set in advance (step #44). Then, when the rotational speed has reached the engagement starting speed or more (step #44: Yes), the second clutch C2 serving as the second engagement element is first engaged (step #45). Then, in order to also engage the engagement element other than the second clutch C2, the process proceeds to the step #46 to be described next.

Before engaging the engagement element, which is to be engaged later and is other than either the first clutch C1 and the second clutch C2, first of all, the target rotational speed determination unit 36 determines the target rotational speed of the input shaft I (step #46). Because the determination method of the target rotational speed of the input shaft I by the target rotational speed determination unit 36 has already been described, detailed description thereof will be omitted here. In addition, the rotational speed of the input shaft I is obtained by the input shaft rotational speed sensor Se1 (step #47). Then, it is judged whether or not the rotational speed of the input shaft I thus obtained has become approximately equal to the target rotational speed determined by the target rotational speed determination unit 36, that is, whether or not the synchronization has been achieved (step #48). If the synchronization is judged to have been achieved (step #48: Yes), the switching control unit 35 engages the predefined engagement element corresponding to the target shift speed (step #49), and terminates the clutch re-engagement control.

On the other hand, if the synchronization is judged to have not been achieved (step #48: No), it is judged whether or not the target shift speed determined by the target shift speed determination unit 34 based on the vehicle speed and the accelerator operation amount has been changed (step #50). If the target shift speed is judged to have not been changed (step #50: No), the process returns to the step #48, and repeats the processing of the steps #48 to #50 in a sequential manner. On the other hand, if the target shift speed is judged to have been changed (step #50: Yes), then it is judged whether or not the changing pattern of the target shift speed corresponds to the predetermined allowable shift pattern (step #51). In the present example, the judgment as to whether or not the changing pattern corresponds to the allowable shift pattern is made by referring to the allowable shift table 43 stored in the memory 41. If the changing pattern of the target shift speed is judged as not corresponding to the allowable shift pattern (step #51: No), the switching control unit 35 engages the predefined engagement element corresponding to the target shift speed before the change (step #49), and terminates the clutch re-engagement control. Although not shown, the switching control unit 35 thereafter engages the predefined engagement elements corresponding to the target shift speed after the change, thereby achieving the target shift speed after the change.

On the other hand, if the target shift speed is judged to have been changed (step #50: Yes), and moreover if the changing pattern of the target shift speed is judged as corresponding to the allowable shift pattern (step #51: Yes), the shifting transition control is executed (step #52). Because the processing content of the shifting transition control has already been described, detailed description thereof will be omitted here. Thus, the clutch re-engagement control ends.

6. Specific Examples of Switching Control Process

Figure 10:
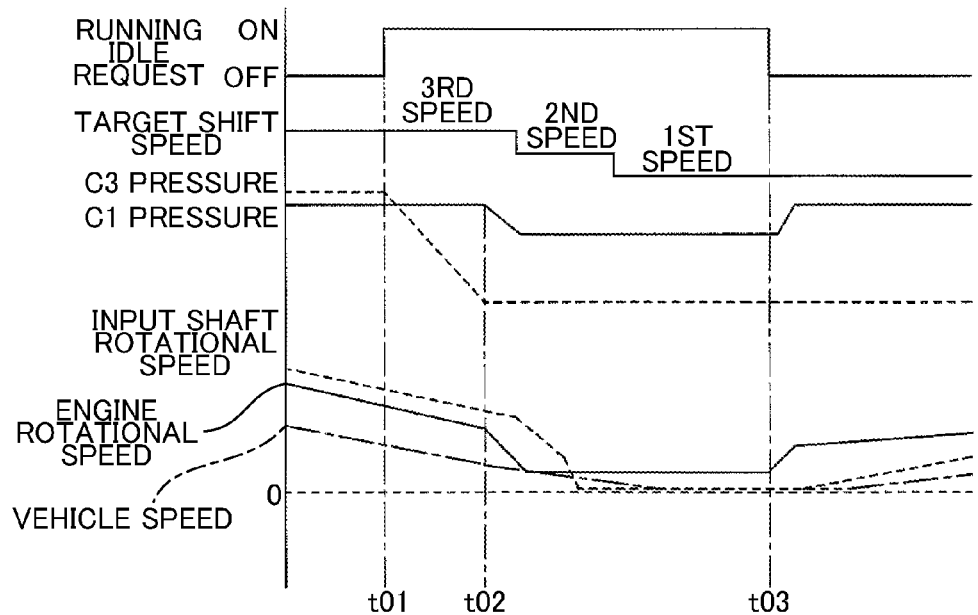
FIG. 10 is a timing chart for explaining an example of the switching control process according to the first embodiment.
Figure 11:
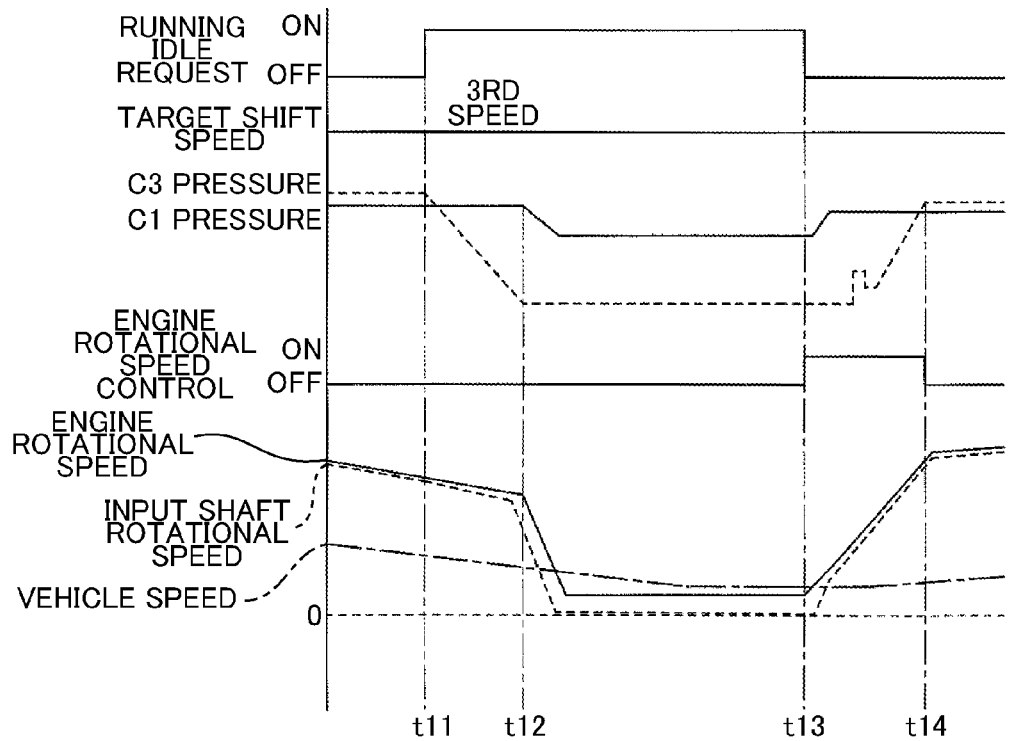
FIG. 11 is a timing chart for explaining an example of the switching control process according to the first embodiment.
Figure 12:
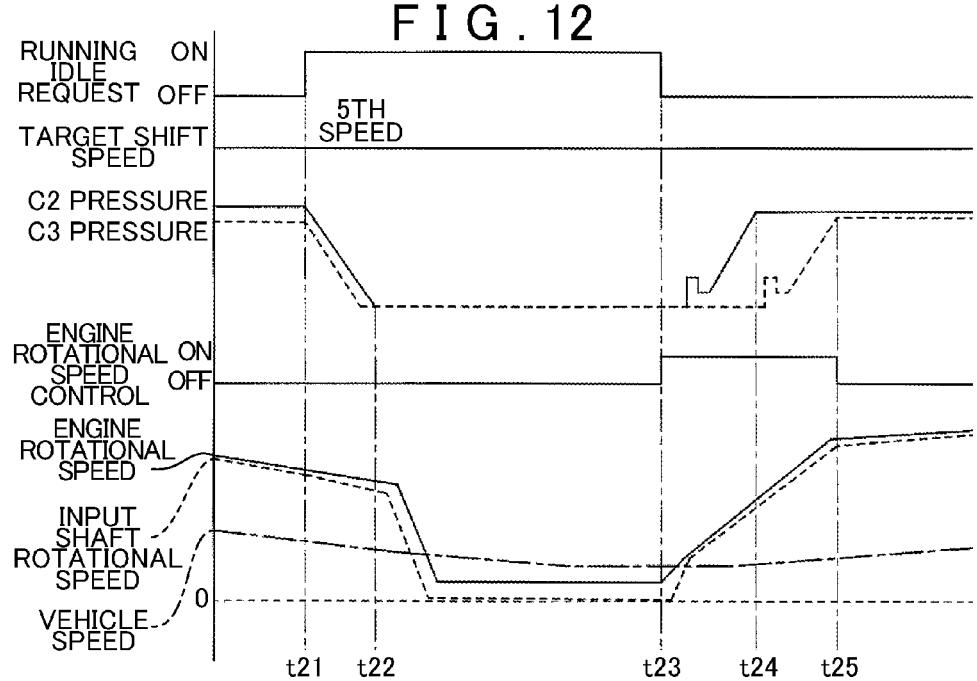
FIG. 12 is a timing chart for explaining an example of the switching control process according to the first embodiment.
Figure 13:
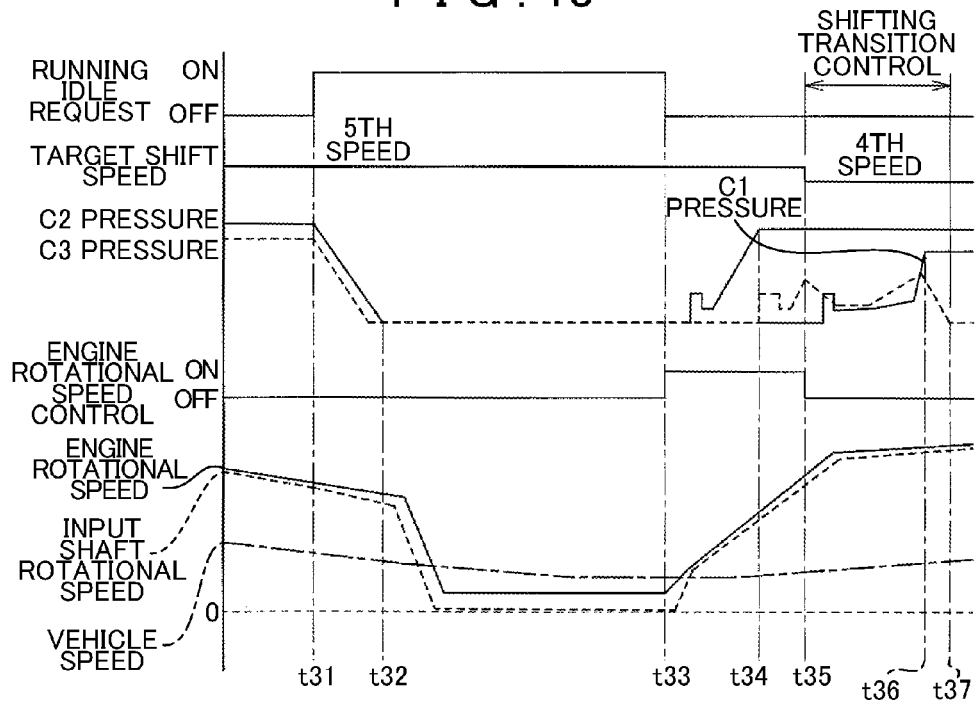
FIG. 13 is a timing chart for explaining an example of the switching control process according to the first embodiment.

Next, specific examples of the switching control process by the vehicle drive unit 1 according to the present embodiment will be described. FIGS. 10 to 13 are timing charts for explaining examples of the switching control process according to the present embodiment. FIG. 10 shows an example in which the shift speed before transitioning to the running idle state is the third speed and the target shift speed when transitioning from the running idle state is the first speed. FIG. 11 shows an example in which both the shift speed when transitioning to the running idle state and the target shift speed when transitioning from the running idle state are the third speed. FIG. 12 shows an example in which both the shift speed when transitioning to the running idle state and the target shift speed when transitioning from the running idle state are the fifth speed. FIG. 13 shows an example in which, in the case that both the shift speed when transitioning to the running idle state and the target shift speed when transitioning from the running idle state are the fifth speed, the target shift speed is changed from the fifth speed to the fourth speed after the second clutch C2 has been engaged and before the rotational speed of the input shaft I reaches the target rotational speed. Note that, in the following description, duplicate explanations will be partially omitted.

First of all, description will be made using an example in which the shift speed before transitioning to the running idle state is the third speed and the target shift speed when transitioning from the running idle state is the first speed. As shown in FIG. 10, if the shift speed when the running idle request has turned on at t01 has been the third speed, the switching control unit 35 controls the hydraulic pressure supplied to the third clutch C3 so as to be gradually reduced, while maintaining the first clutch C1 in the engaged state. Then, with the third clutch C3 being completely disengaged at t02, the first speed as the one-way transmission speed is achieved in the transmission device TM in the running idle state. Then, because the first speed is achieved as the one-way transmission speed in the transmission device TM, transmission of the rotational driving force from the output gear O to the input shaft I is cut off. As a result, the co-rotation of the engine E by rotation of the output gear O (wheels 6) is eliminated, and thus the rotational speed of the engine E decreases, whereby the engine E is transitioned to the state in which it is controlled by the idle control. Because the engine E is rotating in the running idle state, the mechanical pump 21 is rotationally driven, thereby discharging the hydraulic oil of the predetermined pressure. The hydraulic oil of the predetermined pressure discharged by driving the mechanical pump 21 is supplied to the first clutch C1 of the transmission device TM via the hydraulic control device 25. Therefore, even in the running idle state, the first clutch C1 is maintained in the engaged state, thereby maintaining the state in which the first speed is achieved.

Although the vehicle 5 stops thereafter, the first speed as the one-way transmission speed is maintained even during the stop of the vehicle. Then, assume that the target shift speed has become the first speed during the stop of the vehicle, and in that state, the running idle request turns off at t03 due to increase in the accelerator operation amount, etc. In this case, the first speed is already achieved in the transmission device TM in the running idle state as described above. Therefore, when having transitioned from the running idle state, the state is achieved early in which the rotational driving force of the input shaft I (engine E) is transmitted to the wheels 6. That is, the response in the driving force transmission when transitioning from the running idle state is greatly improved. Note that the response in the driving force transmission is also greatly improved in the same manner, in the case of turning off the running idle request while the vehicle 5 is not stopped but running. It is one of features of the present invention that the first speed as the one-way transmission speed is achieved in the running idle state after the running idle request is turned on until the vehicle speed becomes zero to stop the vehicle.

Next, description will be made of the example in which both the shift speed before transitioning to the running idle state and the target shift speed when transitioning from the running idle state are the third speed. As shown in FIG. 11, the flow of the switching process until t12 is the same as the flow of the switching process until t02 in FIG. 10. However, the present example is different from the example shown in FIG. 10 in that the vehicle 5 continues running at a certain vehicle speed or higher in the running idle state, and the target shift speed is maintained at the third speed.

Then assume that, while the target shift speed is maintained at the third speed, the running idle request turns off at t13 due to increase in the accelerator operation amount, etc. In this case, the first speed as the one-way transmission speed has been achieved and the first clutch C1 is maintained in the engaged state in the transmission device TM in the running idle state, as described above. Therefore, by only controlling, by the switching control unit 35, the third clutch C3 so as to be engaged, the state is achieved in which the rotational driving force of the input shaft I (engine E) is transmitted to the wheels 6 when having transitioned from the running idle state. That is, because the target shift speed is achieved by merely engaging only the third clutch C3, the response in the driving force transmission when transitioning from the running idle state is also improved in this case.

When engaging the third clutch C3, the above-described engine rotational speed control is executed from t13 until t14. Then, when the rotational speed of the input shaft I becomes approximately equal to the target rotational speed at t14, the third clutch C3 is completely engaged, and the engine rotational speed control ends.

Next, description will be made of the example in which both the shift speed before transitioning to the running idle state and the target shift speed when transitioning from the running idle state are the fifth speed. As shown in FIG. 12, if the shift speed when the running idle request has turned on at t21 has been the fifth speed, the switching control unit 35 controls the hydraulic pressure supplied to the second clutch C2 and the third clutch C3 so as to be gradually reduced. Then, with the second clutch C2 and the third clutch C3 being completely disengaged at t22, the neutral speed is achieved in the transmission device TM. Then, because the neutral speed is achieved in the transmission device TM, transmission of the rotational driving force from the output gear O to the input shaft I is cut off. As a result, the co-rotation of the engine E by rotation of the output gear O (wheels 6) is eliminated, and thus the rotational speed of the engine E decreases, whereby the engine E is transitioned to the state in which it is controlled by the idle control. Because the engine E is rotating in the running idle state, the mechanical pump 21 is rotationally driven, thereby discharging the hydraulic oil of the predetermined pressure. Therefore, even in the running idle state, the state is maintained in which each of the shift speeds can be achieved by supplying the hydraulic oil of the predetermined pressure to the clutches in the transmission device TM via the hydraulic control device 25 immediately after transitioning from the running idle state.

Assume that, thereafter, the running idle request has turned off at t23 while the target shift speed is maintained at the fifth speed. In this case, the neutral speed is achieved and all of the engagement elements are disengaged in the transmission device TM in the running idle state as described above. Therefore, the switching control unit 35 controls the second clutch C2 and the third clutch C3 so as to be sequentially engaged. In that operation, first the second clutch C2 and later the third clutch C3 are engaged.

The second clutch C2 is engaged at t24 when the rotational speed of the input shaft I reaches the predetermined engagement starting speed or more. In order to engage the third clutch C3, the engine rotational speed control is also executed from t23 until t25. Then, when the rotational speed of the input shaft I becomes approximately equal to the target rotational speed at t25, the third clutch C3 is completely engaged, and the engine rotational speed control ends.

Next, description will be made about the example in which, in the case that both the shift speed before transitioning to the running idle state and the target shift speed when transitioning from the running idle state are the fifth speed, the target shift speed is changed from the fifth speed to the fourth speed after the second clutch C2 has been engaged and before the rotational speed of the input shaft I reaches the target rotational speed and the third clutch C3 is engaged. As shown in FIG. 13, the flow of the switching process until t34 is the same as the flow of the switching process until t24 in FIG. 12. However, the present example is different from the example shown in FIG. 12 in that the target shift speed is changed to the fourth speed before the third clutch C3 is completely engaged.

In the present example, the target shift speed is changed from the fifth speed to the fourth speed at t35. Because this changing pattern from the fifth speed to the fourth speed corresponds to the above-described allowable shift pattern, the engine rotational speed control is stopped, and the above-described shifting transition control is executed. That is, during the time from t35 until t36, in order to change the target of achievement to the fourth speed before the fifth speed is achieved, the shifting transition control is performed so as to disengage the third clutch C3 and engage the first clutch C1 while maintaining the second clutch C2 in the engaged state.

In that operation, the pressure of the hydraulic oil supplied to the third clutch C3 is gradually increased from a constantly maintained pressure toward t36 and then reduced to zero, so as to prevent a shift shock from occurring when changing the engaged clutch from the third clutch C3 to the first clutch C1. Then, with the first clutch C1 and the second clutch C2 being completely engaged at t36, and the third clutch C3 being completely disengaged at t37, the fourth speed that is the target shift speed after the change is achieved.

Second Embodiment

Figures 14, 15:
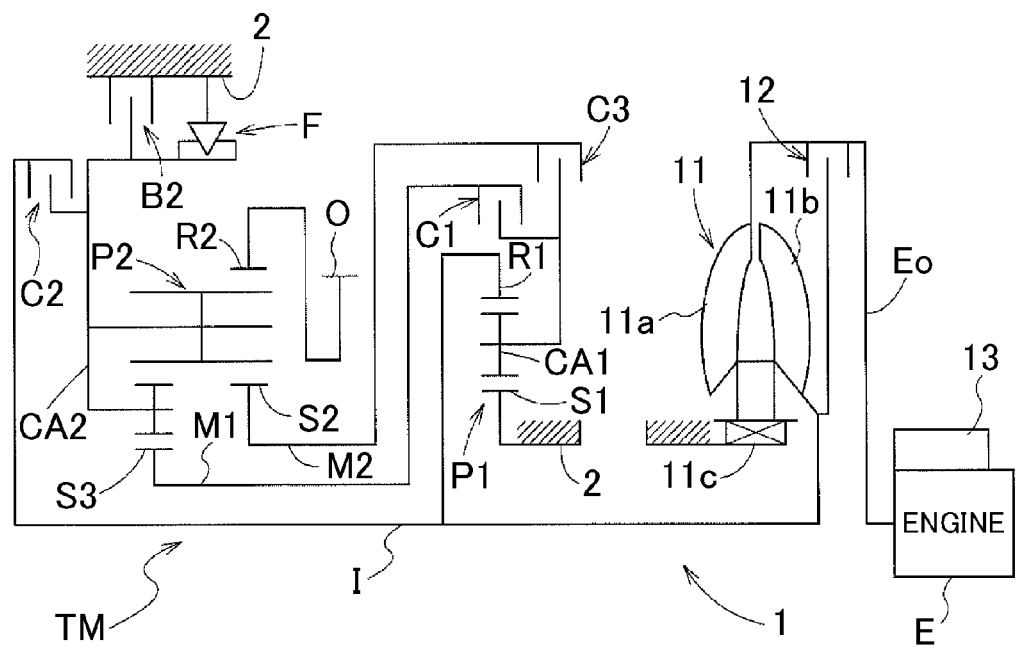
FIG. 14 is a schematic diagram showing a structure of a vehicle drive unit according to a second embodiment.
FIG. 15 is an operation table showing operating states of a plurality of engagement elements at each shift speed according to the second embodiment.

A second embodiment of the present invention will be described with reference to the accompanying drawings. FIG. 14 is a schematic diagram showing a structure of a drive transmission system of a vehicle drive unit 1 according to the present embodiment. Note that FIG. 14 shows the structure omitting some of axially symmetric parts, in the same manner as in FIG. 2. Here, the structure is also shown omitting the hydraulic control system because the hydraulic control system has the same structure as in the first embodiment. The structure of the vehicle drive unit 1 is the same as that obtained by removing the first brake B1 from the vehicle drive unit 1 in the first embodiment. In the vehicle drive unit 1 of the present embodiment, due to the lack of the first brake B1, the number of the shift speeds provided in the transmission device TM is smaller than that in the first embodiment. Accordingly, there are partial differences from the first embodiment in the contents of the control processing executed by the functional units 32 to 37 of the control unit 31 when transitioning to the running idle state. Except the above-described points, the structure is basically the same as that in the first embodiment. The vehicle drive unit 1 and the control unit 31 for controlling the vehicle drive unit 1 according to the present embodiment will be described below mainly regarding different points from the first embodiment.

Figure 16:
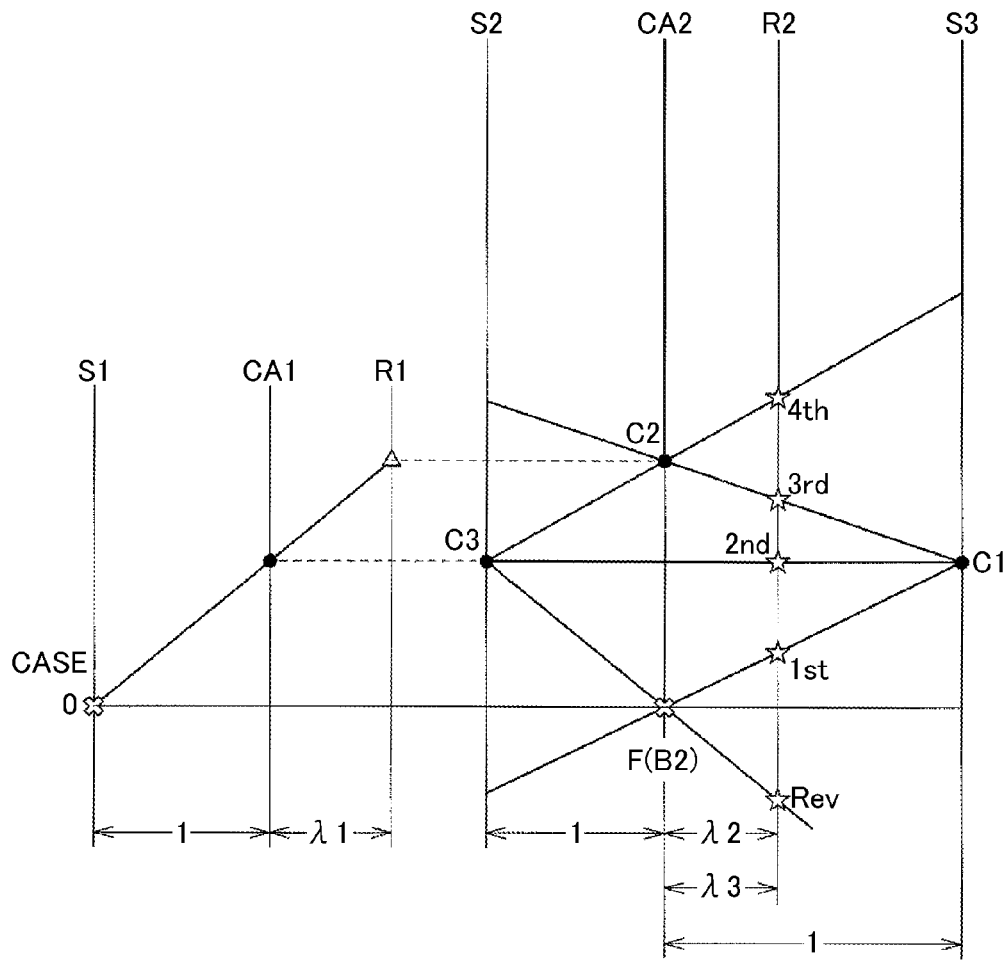
FIG. 16 is a velocity diagram of a transmission device according to the second embodiment.

FIG. 15 is an operation table showing operating states of a plurality of engagement elements at each shift speed according to the present embodiment. FIG. 16 is a velocity diagram of the transmission device TM. Various symbols and descriptions shown in these figures are the same as those in FIGS. 3 and 4. As shown in these figures, in the present embodiment, the transmission device TM is provided with four shift speeds including a first speed, a second speed, a third speed, and a fourth speed, as forward speeds achieved by switching the operating states of the plurality of engagement elements. Corresponding to the structure of the vehicle drive unit 1 that is the same as that obtained by removing the first brake B1 from the vehicle drive unit 1 in the first embodiment, the transmission device TM is provided with neither of the second speed nor the sixth speed provided in the first embodiment. The first speed, the second speed, the third speed, and the fourth speed in the present embodiment correspond to the first speed, the third speed, the fourth speed, and the fifth speed, respectively, in the first embodiment. Corresponding to this arrangement, the shift map 42 (not shown) stored in the memory 41 also differs from that shown in FIG. 6.

As a result, the transmission device TM according to the present embodiment is provided with the first speed, the second speed, and the third speed as shift speeds achieved at least by engaging the first clutch C1 serving as the first engagement element. The transmission device TM is also provided with the third speed and the fourth speed as shift speeds achieved at least by engaging the second clutch C2 serving as the second engagement element. Note that, also in the present embodiment, the first speed is the one-way transmission speed achieved by cooperation between the engagement of the first clutch C1 and the one-way clutch F.

In the present embodiment, as conditions for the switching control unit 35 to control the transmission device TM so as to achieve the first speed in the running idle state, a first condition and a second condition described below are set to be satisfied. The first condition is set such that the shift speed in the transmission device TM before transitioning to the running idle state is a shift speed achieved at least by engaging the first clutch C1. In the present example, the first condition is satisfied if a shift speed before transitioning to the running idle state is any one of the first to third speeds. The second condition is set such that the vehicle speed obtained by the vehicle speed sensor Se2 before transitioning to the running idle state is a predetermined disengagement threshold value Vt or less. In the present example, the predetermined disengagement threshold value Vt is set to be equal to a vehicle speed Vd' (not shown) for downshift from the third speed to the second speed in the state of the near-zero accelerator operation amount. Note that the disengagement threshold value Vt (=Vd') has a greater value than that of a vehicle speed Vu' for upshift from the first speed to the second speed in the state of the near-zero accelerator operation amount. Consequently, in the present example, the second condition is satisfied if the shift speed before transitioning to the running idle state is the first speed or the second speed in the state of the near-zero accelerator operation amount. Therefore, in the present embodiment, the switching control unit 35 controls the transmission device TM so as to achieve the first speed as the one-way transmission speed if the shift speed before transitioning to the running idle state is the first speed or the second speed.

In the present embodiment, the rotational driving force from the output gear O to the input shaft I is not transmitted at the one-way transmission speed. Therefore, drag of the engine E (co-rotation of the engine E together with the input shaft I) in the running idle state is avoided. As a result, in the running idle state, because the rotary electric machine MG can use the rotational driving force transmitted from the wheels 6 to perform regenerative braking while an energy loss by the drag of the engine E is suppressed, the efficiency of regeneration by the rotary electric machine MG can be improved.

On the other hand, the rotational driving force from the input shaft I to the output gear O is transmitted at the one-way transmission speed. Therefore, when transitioning from the running idle state to drive the vehicle 5, the rotational driving force of the engine E can promptly be transmitted to the output gear O (wheels 6) via the input shaft I. Therefore, also with the vehicle drive system provided with the vehicle control device according to the present embodiment, the response in the driving force transmission can be improved when transitioning from the running idle state, while improving the regeneration efficiency of the rotary electric machine MG in the running idle state.

On the other hand, if one or both of the first and the second conditions are not satisfied, the switching control unit 35 disengages all of the engagement elements of the transmission device TM in the running idle state. Specifically, if the shift speed before transitioning to the running idle state is the third speed or the fourth speed, the switching control unit 35 controls the transmission device TM so as to achieve the neutral speed by disengaging all of the engagement elements including the first clutch C1. In this way, if one or both of the first and the second conditions are not satisfied, the neutral speed is achieved in the transmission device TM, thus increasing the degree of freedom of setting of the shift speed in the transmission device TM when transitioning from the running idle state, and thereby enabling an appropriate response depending on the situation.

In the present embodiment, when transitioning from the running idle state, the first clutch C1 as the first engagement element or the second clutch C2 as the second engagement element is engaged first. However, in the present embodiment, unlike in the first embodiment, the first speed, the second speed, and the third speed are provided as shift speeds achieved by engaging the first clutch C1. In addition, the third speed and the fourth speed are provided as shift speeds achieved by engaging the second clutch C2. Consequently, in the present example, the changing pattern allows a downshift between the first speed and the second speed, and a downshift between the third speed and the fourth speed. That is, two patterns of the downshift from the second to the first speed and the downshift from the fourth to the third speed are included in the allowable shift patterns. Moreover, in the present embodiment, when making a downshift from the fourth speed to the first speed or the second speed, the shift speed is controlled so as to first achieve the third speed and then change to the target shift speed. Accordingly, the allowable shift patterns further include the following two patterns: the downshift from the fourth to the first speed, and the downshift from the fourth to the second speed. Consequently, in the present example, a total of four changing patterns are set as the allowable shift patterns.

Other Embodiments (1) The above embodiments have been described by way of examples in which the first and the second conditions are set, and if both of the conditions are satisfied, the switching control unit 35 controls the transmission device TM so as to achieve the first speed as the one-way transmission speed in the running idle state. However, embodiments of the present invention are not limited to this. That is, it is also one of preferred embodiments of the present invention, for example, to have a structure in which, without setting such conditions, the switching control unit 35 controls the transmission device TM so as to unconditionally achieve the first speed as the one-way transmission speed in the running idle state.

(2) It is also one of preferred embodiments of the present invention to have a structure in which only the first condition is set, and if the first condition is satisfied, the switching control unit 35 controls the transmission device TM so as to achieve the first speed as the one-way transmission speed in the running idle state. In this case, in the first embodiment, the switching control unit 35 performs the control so as to achieve the first speed as the one-way transmission speed if the shift speed in the transmission device TM before transitioning to the running idle state is any one of the first to fourth speeds. On the other hand, in the second embodiment, the switching control unit 35 performs the control so as to achieve the first speed as the one-way transmission speed if the shift speed in the transmission device TM before transitioning to the running idle state is any one of the first to third speeds.

(3) Alternatively, it is also one of preferred embodiments of the present invention to have a structure in which only the second condition is set, and if the second condition is satisfied, the switching control unit 35 controls the transmission device TM so as to achieve the first speed as the one-way transmission speed in the running idle state. In this case, the level of the predetermined disengagement threshold value Vt can be set as appropriate. It is also one of preferred embodiments of the present invention, for example, in the first embodiment, to have a structure in which the predetermined disengagement threshold value Vt is set to an arbitrary value that is equal to or more than the vehicle speed Vu for upshift from the second speed to the third speed in the state of the near-zero accelerator operation amount, and that is less than the vehicle speed Vd for downshift from the fourth speed to the third speed in the state of the near-zero accelerator operation amount. The same applies to the second embodiment as well.

(4) The above embodiments have been described by way of examples in which the engine E is controlled by the idle control when the neutral speed is achieved by disengaging all of the engagement elements of the transmission device TM in the running idle state. However, embodiments of the present invention are not limited to this. That is, it is also one of preferred embodiments of the present invention to have a structure in which, in the state of all the engagement elements of the transmission device TM being disengaged, the engine E is stopped while the vehicle 5 is running to establish a running idle-stop state instead of the running idle state.

Because the hydraulic oil of the predetermined pressure for engaging the engagement elements of the transmission device TM need not be supplied in the state of all the engagement elements of the transmission device TM being disengaged, the engine E can be stopped even while the vehicle 5 is running. As a result, also with the above-described structure, fuel consumption by engine combustion is suppressed by stopping the engine E in the state in which the engine E can be stopped.

In this case, when transitioning from the running idle-stop state by turning off the running idle request, the control unit 31 drives the starter 13 to start the engine E. Then, after the engine E has started, the control unit 31 performs the clutch re-engagement control, etc. to be performed when transitioning from the running idle state.

It is also preferable that the vehicle drive unit 1 is provided with, in addition to the mechanical pump 21, the electric pump discharging oil, while the mechanical pump 21 stops operating, so as to be capable of supplying the hydraulic pressure to the plurality of engagement elements of the transmission device TM. In the running idle-stop state, the engine E stops rotating, and the mechanical pump 21 stops operating. Therefore, the electric pump can supply the hydraulic pressure during this situation. It is also preferable that the electric pump is placed in a non-driven state if all of the engagement elements of the transmission device TM are disengaged in the running idle-stop state.

If all of the engagement elements of the transmission device TM are disengaged, the hydraulic oil of the predetermined pressure need not be supplied to engage the engagement elements of the transmission device TM. Consequently, even in the vehicle drive unit 1 provided with the electric pump discharging oil while the mechanical pump 21 stops operating, if all of the engagement elements of the transmission device TM are disengaged in the running idle-stop state, the electric pump is placed in the non-driven state to shorten the driving time of the electric pump, thereby enabling to extend the lifetime of the electric pump and to save battery power for driving the electric pump.

(5) The above embodiments have been described by way of examples in which the first speed that is the shift speed having the largest speed ratio (speed reduction ratio) is set as the one-way transmission speed. However, embodiments of the present invention are not limited to this. That is, it is also one of preferred embodiments of the present invention to have a structure in which, for example, the second speed that is a shift speed having the second largest speed ratio (speed reduction ratio) is set as the one-way transmission speed. In this case, the structure can be such that, in the first embodiment, for example, the one-way clutch F serving as a unidirectional clutch becomes engaged only when the second intermediate shaft M2 rotates in the negative direction, thereby selectively stopping the second intermediate shaft M2 and the first sun gear S2 of the second planetary gear unit P2 by fixing them to the case 2. In this case, the structure can be such that the first speed is achieved by cooperation between the engagement of the first clutch C1 and the engagement of the second brake B2, and the second speed is achieved by cooperation between the engagement of the first clutch C1 and the one-way clutch F.

(6) The above embodiments have been described by way of examples in which among the two engagement elements to be engaged in the transmission device TM when transitioning from the running idle state, the engagement element, which is to be engaged later and is other than either of the first clutch C1 and the second clutch C2, is engaged after the engine rotational speed control is performed. However, embodiments of the present invention are not limited to this. That is, it is also one of preferred embodiments of the present invention to have a structure in which the engagement element to be engaged later is engaged without performing the engine rotational speed control. In this case, the structure can be such that the hydraulic oil according to a predetermined command signal is supplied via the hydraulic control device 25 to the engagement element to be engaged later, and the target shift speed is achieved through a preliminary filling phase, a torque phase, and an inertia phase.

(7) The above embodiments have been described by way of examples in which, if the target shift speed is changed to a new shift speed before the original target shift speed in the case of transitioning from the running idle state is achieved, and if the changing pattern of the target shift speed corresponds to a predetermined allowable shift pattern, the switching control unit 35 performs the shifting transition control. However, embodiments of the present invention are not limited to this. That is, it is also one of preferred embodiments of the present invention to have a structure in which such an allowable shift pattern is not set, and the shifting transition control is not performed. In this case, the structure can be such that the switching control unit 35 switches the engagement state of each engagement element so that the target shift speed before the change is achieved by engaging the engagement element to be engaged later, and then the new target shift speed after the change is achieved after passing through the target shift speed before the change.

(8) The above embodiments have been described by way of examples in which, if the neutral speed has been achieved in the transmission device TM in the running idle state, the switching control unit 35 performs control, when transitioning from the running idle state, so as to engage first the second clutch C2 serving as the second engagement element, and then the engagement element other than the second clutch C2 corresponding to the target shift speed. However, embodiments of the present invention are not limited to this. That is, it is also one of preferred embodiments of the present invention to have a structure in which the control is performed so as to engage first the engagement element other than the second clutch C2 corresponding to the target shift speed, and then the second clutch C2 serving as the second engagement element.

Specifically, for example, in the first embodiment, engagement may be performed in the order of the first clutch C1 and the second clutch C2 if the target shift speed at the time when transitioning from the running idle state is the fourth speed, in the order of the third clutch C3 and the second clutch C2 if the target shift speed is the fifth speed, or in the order of the first brake B1 and the second clutch C2 if the target shift speed is the sixth speed. The carrier CA1 of the first planetary gear unit P1, the first intermediate shaft M1, and the second intermediate shaft M2 that are fixed to the case 2 or rotated in an integrated manner with each other by engagement of the first clutch C1, the third clutch C3, and the first brake B1 are in a free rotation state while all of the engagement elements are disengaged so that the neutral speed is achieved. Therefore, by structuring any one of the first clutch C1, the third clutch C3, and the first brake B1 to be engaged first, although the number of the allowable shift patterns is reduced, an advantage is obtained such that engagement shocks can be prevented from occurring when engaging these engagement elements.

(9) The above embodiments have been described by way of examples in which the transmission device TM is structured by combining the single pinion type first planetary gear unit P1 structured to have three rotational elements with the Ravigneaux type second planetary gear unit P2 structured to have four rotational elements. However, embodiments of the present invention are not limited to this. That is, the specific internal structure of the transmission device TM can be changed as appropriate. It is also one of preferred embodiments of the present invention to have a structure in which the transmission device TM is structured, for example, by having only the second planetary gear unit P2, by combining a double pinion type planetary gear unit with the Ravigneaux type second planetary gear unit P2, or by combining three or more of the single pinion type or double pinion type planetary gear units.

(10) The first embodiment has been described by way of examples in which the transmission device TM is provided with six shift speeds of different speed ratios (speed reduction ratios). On the other hand, the second embodiment has been described by way of examples in which the transmission device TM is provided with four shift speeds of different speed ratios (speed reduction ratios). However, embodiments of the present invention are not limited to this. That is, the number of shift speeds provided in the transmission device TM can be set to any value that is two or more.

(11) The above embodiments have been described by way of examples in which the control unit 31 controls the four-wheel drive (4WD) type vehicle drive system structured such that the output gear O provided in the vehicle drive unit 1 is drivingly connected to the front wheels of the vehicle 5, and the output shaft of the rotary electric machine MG that can output a driving force is drivingly connected to the rear wheels of the vehicle 5. However, embodiments of the present invention are not limited to this. That is, it is also one of preferred embodiments of the present invention to have a structure in which the control unit 31 controls a vehicle drive system structured such that the output gear O provided in the vehicle drive unit 1 is drivingly connected to the rear wheels of the vehicle 5, and the output shaft of the rotary electric machine MG that can output a driving force is drivingly connected to the front wheels of the vehicle 5. Alternatively, the output shaft of the rotary electric machine MG may be structured to be drivingly connected to the output gear O provided in the vehicle drive unit 1. In these cases, in the same manner as in the above-described embodiments, the response in the driving force transmission can be improved when transitioning from the running idle state, while improving the regeneration efficiency of the rotary electric machine MG in the running idle state.

(12) It is also one of preferred embodiments of the present invention to have a structure in which the control unit 31 controls the vehicle 5 structured to have only the vehicle drive unit 1 without having the rotary electric machine MG. In this case, the response in the driving force transmission can be improved when transitioning from the running idle state while avoiding the engine drag in the running idle state.

The present invention can preferably be used for a control device for controlling a vehicle drive unit equipped with an input member drivingly connected to an engine, an output member drivingly connected to wheels, and a transmission device that transmits a rotational driving force of the input member to the output member at a speed changed at a speed ratio of each shift speed, and for a vehicle drive system equipped with the vehicle drive unit controlled by such a control device.

What is claimed is:

1. A vehicle control device for controlling a vehicle drive unit that includes: an input member drivingly connected to an engine; an output member drivingly connected to a wheel; and a transmission device that includes a plurality of engagement elements, that switches between a plurality of shift speeds by control of engagement and disengagement of the plurality of engagement elements, and that transmits a rotational driving force of the input member to the output member at a speed changed at a speed ratio of each of the shift speeds, comprising:

a control unit that controls the transmission device so as to achieve a one-way transmission speed in a running idle state in which a vehicle is running while the rotational driving force of the input member is not transmitted to the output member and a rotational speed of the engine is controlled to a predetermined idle speed, wherein the transmission device has, as one of the plurality of shift speeds, the one-way transmission speed at which the rotational driving force from the input member to the output member is transmitted but the rotational driving force from the output member to the input member is not transmitted;

wherein the transmission device comprises:

a first engagement element that transmits the rotational driving force of the input member to one of a plurality of rotational elements included in the transmission device in an engaged state; and a unidirectional clutch that is placed in a state in which the rotational driving force from the input member to the output member is transmitted but the rotational driving force from the output member to the input member is not transmitted in the state in which the first engagement element is engaged; and wherein the one-way transmission speed is achieved by cooperation between the engagement of the first engagement element and the unidirectional clutch;

wherein the control unit achieves the one-way transmission speed by engaging the first engagement element in the running idle state if the shift speed in the transmission device before transitioning to the running idle state is a shift speed achieved by at least the engagement of the first engagement element, and the control unit disengages all of the engagement elements of the transmission device in the running idle state if the shift speed in the transmission device before transitioning to the running idle state is a shift speed other than that achieved by at least the engagement of the first engagement element.

2. A vehicle control device for controlling a vehicle drive unit that includes: an input member drivingly connected to an engine; an output member drivingly connected to a wheel; and a transmission device that includes a plurality of engagement elements, that switches between a plurality of shift speeds by control of engagement and disengagement of the plurality of engagement elements, and that transmits a rotational driving force of the input member to the output member at a speed changed at a speed ratio of each of the shift speeds, comprising:

a control unit that controls the transmission device so as to achieve a one-way transmission speed in a running idle state in which a vehicle is running while the rotational driving force of the input member is not transmitted to the output member and a rotational speed of the engine is controlled to a predetermined idle speed, wherein the transmission device has, as one of the plurality of shift speeds, the one-way transmission speed at which the rotational driving force from the input member to the output member is transmitted but the rotational driving force from the output member to the input member is not transmitted;

wherein the transmission device comprises:

a first engagement element that transmits the rotational driving force of the input member to one of a plurality of rotational elements included in the transmission device in an engaged state; and a unidirectional clutch that is placed in a state in which the rotational driving force from the input member to the output member is transmitted but the rotational driving force from the output member to the input member is not transmitted in the state in which the first engagement element is engaged; and wherein the one-way transmission speed is achieved by cooperation between the engagement of the first engagement element and the unidirectional clutch;

wherein the control unit achieves the one-way transmission speed by engaging the first engagement element in the running idle state if the running speed of the vehicle before transitioning to the running idle state is equal to or less than a predetermined disengagement threshold value, and the control unit disengages all of the engagement elements of the transmission device in the running idle state if the running speed of the vehicle before transitioning to the running idle state is more than the predetermined disengagement threshold value.

3. The vehicle control device according to claim 1, wherein the one-way transmission speed is a shift speed having the largest speed reduction ratio between the input member and the output member among the forward shift speeds.

4. The vehicle control device according claim 1, wherein, when the state of the vehicle during running returns from the running idle state to a normal state in which the rotational driving force of the input member is transmitted to the output member, the control unit performs engine rotational speed control for controlling the rotational speed of the input member so as to be a target rotational speed determined based on the running speed of the vehicle and a target shift speed in the transmission device, and then engages a predefined engagement element in the transmission device.

5. The vehicle control device according to claim 4, wherein, when the target shift speed in the transmission device has been changed before the rotational speed of the input member reaches the target rotational speed during the engine rotational speed control, the control unit performs the engine rotational speed control to achieve the target rotational speed before the change, and then achieves the target rotational speed after the change, if the changing pattern of the target shift speed does not correspond to a predetermined allowable shift pattern, or the control unit discontinues the engine rotational speed control and stops achieving the target rotational speed before the change, and achieves the target rotational speed after the change, if the changing pattern of the target shift speed corresponds to the allowable shift pattern.

6. The vehicle control device according to claim 5, wherein, if each of the shift speeds in the transmission device is achieved by engagement of two of the engagement elements, the allowable shift pattern is a changing pattern corresponding to a change between shift speeds in which the engagement elements engaged first are common and the engagement elements engaged later are different, and also to a change from a shift speed with a small speed reduction ratio to a shift speed with a large speed reduction ratio.

7. The vehicle control device according to claim 4, wherein the transmission device comprises:

a first engagement element that transmits the rotational driving force of the input member to one of a plurality of rotational elements included in the transmission device in an engaged state; and a unidirectional clutch that is placed in a state in which the rotational driving force from the input member to the output member is transmitted but the rotational driving force from the output member to the input member is not transmitted in the state in which the first engagement element is engaged, the one-way transmission speed is achieved by cooperation between the engagement of the first engagement element and the unidirectional clutch, the transmission device has the plurality of shift speeds in a switchable manner by selectively engaging any two of the plurality of engagement elements including the first engagement element, and has a shift speed achieved at least by engaging a second engagement element different from the first engagement element, and the control unit engages first the second engagement element of the two engagement elements when returning to the normal state, if the shift speed in the transmission device before transitioning of the engine to the running idle state is the shift speed achieved by engaging the second engagement element.

8. The vehicle control device according to claim 1, wherein all of the engagement elements of the transmission device are disengaged to establish, instead of the running idle state, a running idle-stop state in which the engine is stopped while the vehicle is running.

9. The vehicle control device according to claim 8, comprising a mechanical pump driven by rotational driving force of the engine to discharge oil and an electric pump discharging oil, while the mechanical pump stops operating, so as to optionally supply hydraulic pressure to the plurality of engagement elements, wherein the control unit places the electric pump in a non-driven state if all of the engagement elements of the transmission device are disengaged in the running idle-stop state.

10. The vehicle control device according to claim 1, wherein the transmission device comprises a first planetary gear unit having three rotational elements, including in the order of rotational speed, a first rotational element, a second rotational element, and a third rotational element, and a second planetary gear unit having four rotational elements, including in the order of rotational speed, a first rotational element, a second rotational element, a third rotational element, and a fourth rotational element;

in the first planetary gear unit, the first rotational element is fixed to a non-rotating member, the second rotational element is selectively drivingly connected to the fourth rotational element of the second planetary gear unit via the first engagement element, and the third rotational element is drivingly connected to the input member, and in the second planetary gear unit, the second rotational element is selectively fixed to a non-rotating member via a unidirectional clutch that is placed in an engaged state to prevent rotation of the second rotational element when rotating in the negative direction relative to the non-rotating member, and the third rotational element is drivingly connected to the output member.

11. The vehicle control device according to claim 10, wherein the second rotational element of the first planetary gear unit is further selectively drivingly connected to the first rotational element of the second planetary gear unit, and the second rotational element of the second planetary gear unit is further selectively drivingly connected to the input member via the second engagement element.

12. The vehicle control device according to claim 11, wherein the first rotational element of the second planetary gear unit is further selectively fixed to the non-rotating member.

13. A vehicle drive system, wherein the output member included in the vehicle drive unit controlled by the vehicle control device according to claim 1 is drivingly connected to either one of a front wheel and a rear wheel of the vehicle, and an output shaft of a rotary electric machine that optionally outputs a driving force is drivingly connected to the other one of the front wheel and the rear wheel of the vehicle.

14. The vehicle control device according claim 2, wherein, when the state of the vehicle during running returns from the running idle state to a normal state in which the rotational driving force of the input member is transmitted to the output member, the control unit performs engine rotational speed control for controlling the rotational speed of the input member so as to be a target rotational speed determined based on the running speed of the vehicle and a target shift speed in the transmission device, and then engages a predefined engagement element in the transmission device.

15. The vehicle control device according to claim 14, wherein, when the target shift speed in the transmission device has been changed before the rotational speed of the input member reaches the target rotational speed during the engine rotational speed control, the control unit performs the engine rotational speed control to achieve the target rotational speed before the change, and then achieves the target rotational speed after the change, if the changing pattern of the target shift speed does not correspond to a predetermined allowable shift pattern, or the control unit discontinues the engine rotational speed control and stops achieving the target rotational speed before the change, and achieves the target rotational speed after the change, if the changing pattern of the target shift speed corresponds to the allowable shift pattern.

16. The vehicle control device according to claim 15, wherein, if each of the shift speeds in the transmission device is achieved by engagement of two of the engagement elements, the allowable shift pattern is a changing pattern corresponding to a change between shift speeds in which the engagement elements engaged first are common and the engagement elements engaged later are different, and also to a change from a shift speed with a small speed reduction ratio to a shift speed with a large speed reduction ratio.

17. The vehicle control device according to claim 14, wherein the transmission device comprises:
   a first engagement element that transmits the rotational driving force of the input member to one of a plurality of rotational elements included in the transmission device in an engaged state; and
   a unidirectional clutch that is placed in a state in which the rotational driving force from the input member to the output member is transmitted but the rotational driving force from the output member to the input member is not transmitted in the state in which the first engagement element is engaged,
   the one-way transmission speed is achieved by cooperation between the engagement of the first engagement element and the unidirectional clutch,
   the transmission device has the plurality of shift speeds in a switchable manner by selectively engaging any two of the plurality of engagement elements including the first engagement element, and has a shift speed achieved at least by engaging a second engagement element different from the first engagement element, and
   the control unit engages first the second engagement element of the two engagement elements when returning to the normal state, if the shift speed in the transmission device before transitioning of the engine to the running idle state is the shift speed achieved by engaging the second engagement element.

18. The vehicle control device according to claim 2, wherein all of the engagement elements of the transmission device are disengaged to establish, instead of the running idle state, a running idle-stop state in which the engine is stopped while the vehicle is running.

19. The vehicle control device according to claim 18, comprising a mechanical pump driven by rotational driving force of the engine to discharge oil and an electric pump discharging oil, while the mechanical pump stops operating, so as to optionally supply hydraulic pressure to the plurality of engagement elements, wherein
   the control unit places the electric pump in a non-driven state if all of the engagement elements of the transmission device are disengaged in the running idle-stop state.

20. The vehicle control device according to claim 2, wherein the transmission device comprises a first planetary gear unit having three rotational elements, including in the order of rotational speed, a first rotational element, a second rotational element, and a third rotational element, and a second planetary gear unit having four rotational elements, including in the order of rotational speed, a first rotational element, a second rotational element, a third rotational element, and a fourth rotational element;
   in the first planetary gear unit, the first rotational element is fixed to a non-rotating member, the second rotational element is selectively drivingly connected to the fourth rotational element of the second planetary gear unit via the first engagement element, and the third rotational element is drivingly connected to the input member, and
   in the second planetary gear unit, the second rotational element is selectively fixed to a non-rotating member via a unidirectional clutch that is placed in an engaged state to prevent rotation of the second rotational element when rotating in the negative direction relative to the non-rotating member, and the third rotational element is drivingly connected to the output member.

* * * * *